US012001010B2

(12) United States Patent
Druml et al.

(10) Patent No.: US 12,001,010 B2
(45) Date of Patent: Jun. 4, 2024

(54) SYNCHRONIZATION OF MICROELECTROMECHANICAL SYSTEM (MEMS) MIRRORS

(71) Applicant: Infineon Technologies AG, Neubiberg (DE)

(72) Inventors: Norbert Druml, Graz (AT); Philipp Greiner, Graz (AT); Boris Kirillov, Judendorf-Straßenge (AT); Ievgeniia Maksymova, Graz (AT); Maksym Sladkov, Graz (AT); Hendrikus Van Lierop, Bj Weert (NL)

(73) Assignee: Infineon Technologies AG, Neubiberg (DE)

( * ) Notice: Subject to any disclaimer, the term of this patent is extended or adjusted under 35 U.S.C. 154(b) by 195 days.

(21) Appl. No.: 17/690,149

(22) Filed: Mar. 9, 2022

(65) Prior Publication Data

US 2022/0197015 A1    Jun. 23, 2022

Related U.S. Application Data

(63) Continuation of application No. 16/376,544, filed on Apr. 5, 2019, now Pat. No. 11,307,403.

(51) Int. Cl.
*G02B 26/08* (2006.01)
*G01S 7/481* (2006.01)
*G02B 26/10* (2006.01)

(52) U.S. Cl.
CPC ........ *G02B 26/0841* (2013.01); *G01S 7/4817* (2013.01); *G02B 26/101* (2013.01)

(58) Field of Classification Search
CPC .............. G02B 26/101; G02B 26/0841; G02B 26/0858; G02B 26/105; G02B 26/0833; G02B 26/085; G02B 26/10
See application file for complete search history.

(56) References Cited

U.S. PATENT DOCUMENTS 3,919,527 A    11/1975    Bowen et al.
6,140,979 A    10/2000    Gerhard et al.
(Continued)

FOREIGN PATENT DOCUMENTS

CN    102841495 A    12/2012
CN    108375346 A    8/2018
(Continued)

OTHER PUBLICATIONS

Sander et al., "Hybrid Assembled Micro Scanner Array With Large Aperture and Their System Integration for a 3D ToF Laser Camera," MOEMS and Miniaturized Systems XIV, Proceedings SPIE Digital Library, Mar. 2015, vol. 9375, pp. 937505-1-937505-8.
(Continued)

*Primary Examiner* — Christopher Stanford
(74) *Attorney, Agent, or Firm* — Harrity & Harrity, LLP

(57) ABSTRACT

An oscillator system includes an oscillator structure configured to oscillate about a first axis according to a first oscillation and oscillate about a second axis according to a second oscillation; a first driver configured to drive the first oscillation, detect first zero-crossing events of the first mirror, and generate a first position signal based on the detected first zero-crossing events; a second driver configured to drive the second oscillation, detect second zero-crossing events of the second mirror, and generate a second position signal based on the detected second zero-crossing events; and a synchronization controller configured to receive the first and the second position signals, and synchronize at least one of a phase or a frequency of the second oscillation with at least one of a phase or a frequency of the first oscillation, respectively, based on the first and the second position signals.

12 Claims, 11 Drawing Sheets

(56) References Cited

U.S. PATENT DOCUMENTS

| | | |
|---|---|---|
| 7,605,966 B2 | 10/2009 | Tani et al. |
| 9,291,817 B2 * | 3/2016 | Hashiguchi ........ G02B 26/0858 |
| 9,933,616 B2 | 4/2018 | Ueda |
| 10,514,292 B2 | 12/2019 | Miyazaki |
| 10,654,708 B2 | 5/2020 | Yamada et al. |
| 11,307,403 B2 | 4/2022 | Druml et al. |
| 2002/0050956 A1 | 5/2002 | Gerhard et al. |
| 2012/0327373 A1 | 12/2012 | Hosaka et al. |
| 2018/0231640 A1 | 8/2018 | Han et al. |

FOREIGN PATENT DOCUMENTS

| | | | |
|---|---|---|---|
| CN | 207833020 U | 9/2018 | |
| CN | 109557555 A | 4/2019 | |
| EP | 2862837 B1 * | 7/2018 | ......... B81C 1/00674 |
| JP | 2016031522 A | 3/2016 | |
| KR | 20100078688 A | 7/2010 | |
| WO | WO-2013133286 A1 * | 9/2013 | ............. G01B 11/24 |

OTHER PUBLICATIONS

Sander et al., "Synchronized Micro Scanner Array for Large Aperture Receiver Optics of LIDAR Systems," MOEMS and Miniaturized Systems IX, Proceedings SPIE Digital Library, Feb. 2010, vol. 7594, pp. 75940C1-75940C12.

\* cited by examiner

SYNCHRONIZATION OF MICROELECTROMECHANICAL SYSTEM (MEMS) MIRRORS

CROSS-REFERENCE TO RELATED APPLICATIONS

This application is a continuation of U.S. patent application Ser. No. 16/376,544 filed Apr. 5, 2019, which is incorporated by reference as if fully set forth.

FIELD

The present disclosure relates generally to a microelectromechanical system (MEMS) oscillating system and method for operating the same, and, more particularly, to synchronizing two or more MEMS mirrors in a scanning system.

BACKGROUND

Light Detection and Ranging (LIDAR), is a remote sensing method that uses light in the form of a pulsed laser to measure ranges (variable distances) to one or more objects in a field of view. In particular, a microelectromechanical system (MEMS) mirror is used to scan light across the field of view. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

A LIDAR scanning system may include multiple scanning mirrors and corresponding circuitry for scanning different field of views in the horizontal and/or vertical direction. For example, a vehicle may include multiple scanning mirrors arranged at a same or at different locations on the vehicle to scan different field of views. Thus, it may be desirable to synchronize two or more MEMS mirrors on a system level. In addition, it may be desirable to use synchronized MEMS mirrors in a 2× one-dimensional (1D) system, for example, for Lissajous scanning.

SUMMARY

Embodiments provide microelectromechanical system (MEMS) mirror synchronizing system and methods for operating the same, and, more particularly, to synchronizing two or more MEMS mirrors in a scanning system in terms of having the same phase and the same frequency.

One or more embodiments provide a multi-mirror system includes a first mirror configured to oscillate about a first axis; a second mirror configured to oscillate about a second axis; a first driver configured to drive an oscillation of the first mirror, detect first zero-crossing events of the first mirror, and generate a first position signal based on the detected first zero-crossing events at which an oscillation angle of the first mirror is at a predefined angle; a second driver configured to drive an oscillation of the second mirror, detect second zero-crossing events of the second mirror, and generate a second position signal based on the detected second zero-crossing events at which an oscillation angle of the second mirror is at the predefined angle; and a synchronization controller configured to receive the first position signal and the second position signal, and synchronize at least one of a phase or a frequency of the oscillation of the second mirror with at least one of a phase or a frequency of the oscillation of the first mirror, respectively, based on the first position signal and the second position signal.

One or more embodiments provide a method of synchronizing a second mirror with a first mirror. The method includes driving an oscillation of a first mirror configured to oscillate about a first axis; detecting first zero-crossing events of the first mirror at which an oscillation angle of the first mirror is at a predefined angle; generating a first position signal based on the detected first zero-crossing events; driving an oscillation of a second mirror configured to oscillate about a second axis; detecting second zero-crossing events of the second mirror at which an oscillation angle of the second mirror is at the predefined angle; generating a second position signal based on the detected second zero-crossing events; and synchronizing at least one at least one of a phase or a frequency of the oscillation of the second mirror with at least one of a phase or a frequency of the oscillation of the first mirror, respectively, based on the first position signal and the second position signal.

BRIEF DESCRIPTION OF THE DRAWINGS

Embodiments are described herein making reference to the appended drawings.

DETAILED DESCRIPTION

Figure 1A:
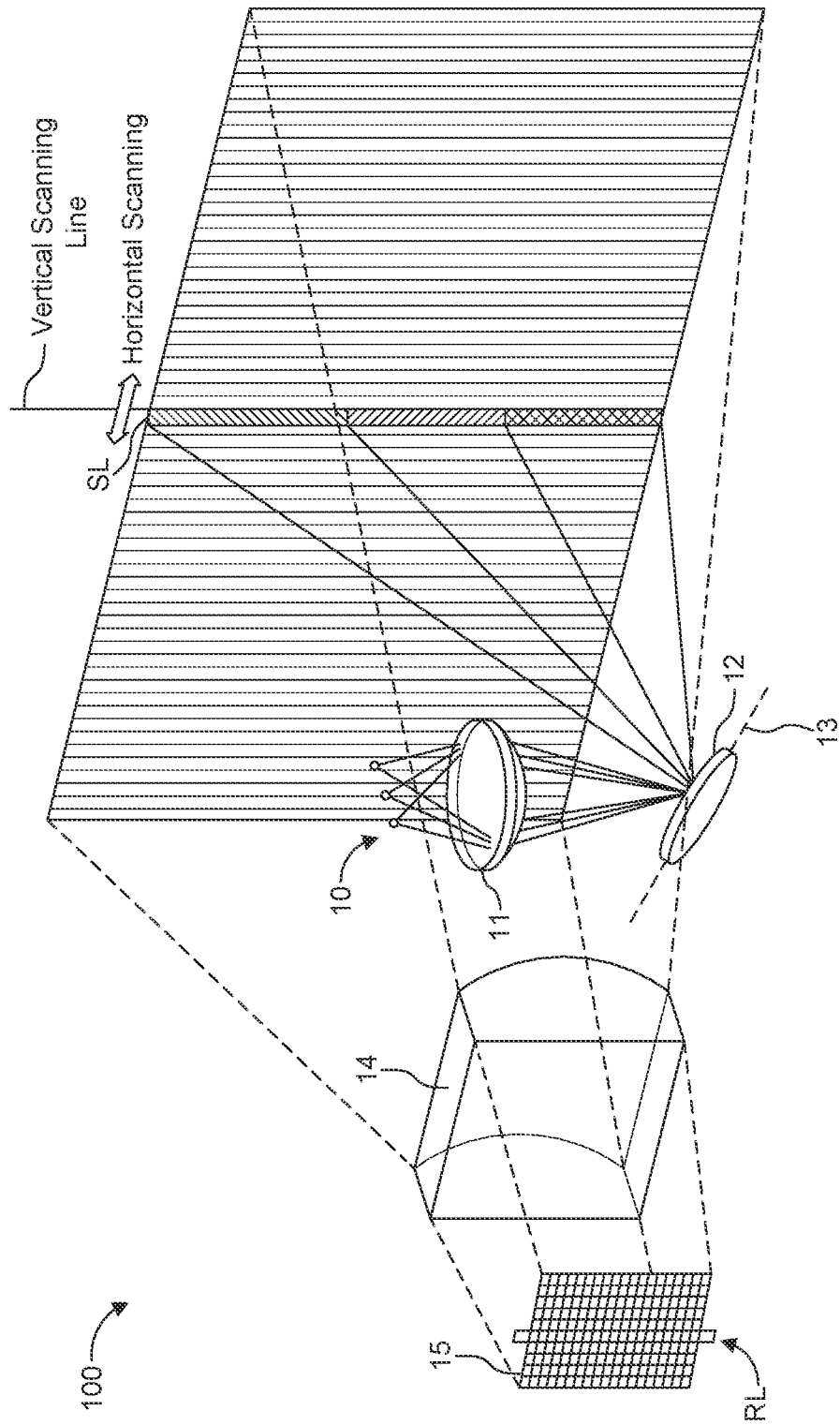
FIG. 1A is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance.

In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm. For example, an ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

A scan such as an oscillating horizontal scan (e.g., from left to right and right to left of a field of view) or an oscillating vertical scan (e.g., from bottom to top and top to bottom of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1A is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) microelectromechanical system (MEMS) mirror 12, and a receiver, including a second optical component 14 and a photodetector detector array 15.

The illumination unit 10 includes multiple light sources (e.g., laser diodes or light emitting diodes) that are linearly aligned in single bar formation and are configured to transmit light used for scanning an object. The light emitted by the light sources is typically infrared light although light with other wavelength might also be used. As can be seen in the embodiment of FIG. 1A, the shape of the light emitted by the light sources is spread in a direction perpendicular to the transmission direction to form a light beam with an oblong shape perpendicular to a transmission. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple segments, where each segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams.

In addition, while three laser sources are shown, it will be appreciated that the number of laser sources are not limited thereto. For example the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is suspended by mechanical springs (e.g., leaf springs, sometimes referred to as cantilever beams) or flexures and is configured to rotate about a single axis and can be said to have only one degree of freedom for movement. Due to this single axis of rotation, the MEMS mirror 12 is referred to as a 1D MEMS mirror.

In order to make a MEMS scanning mirror robust against vibrations, the mirror should have a low inertia, i.e., a light and stiff mirror body. In addition, the mirror should have a high stiffness of its suspension for all degrees-of-freedom (DOF) of the mirror body.

In order to achieve a light and stiff mirror body, the mirror body may comprise a relatively thin mirror and a thicker reinforcement structure for the mirror. The mirror body may be rotatably arranged in a mirror frame around a rotation axis extending in a plane defined by the mirror frame. The rotation axis may extend to first and second mutually opposite end-portions of the mirror body. The mirror may have a reflective plane on a first main surface and opposite the first main surface a second main surface provided with the reinforcement structure.

Figure 1B:
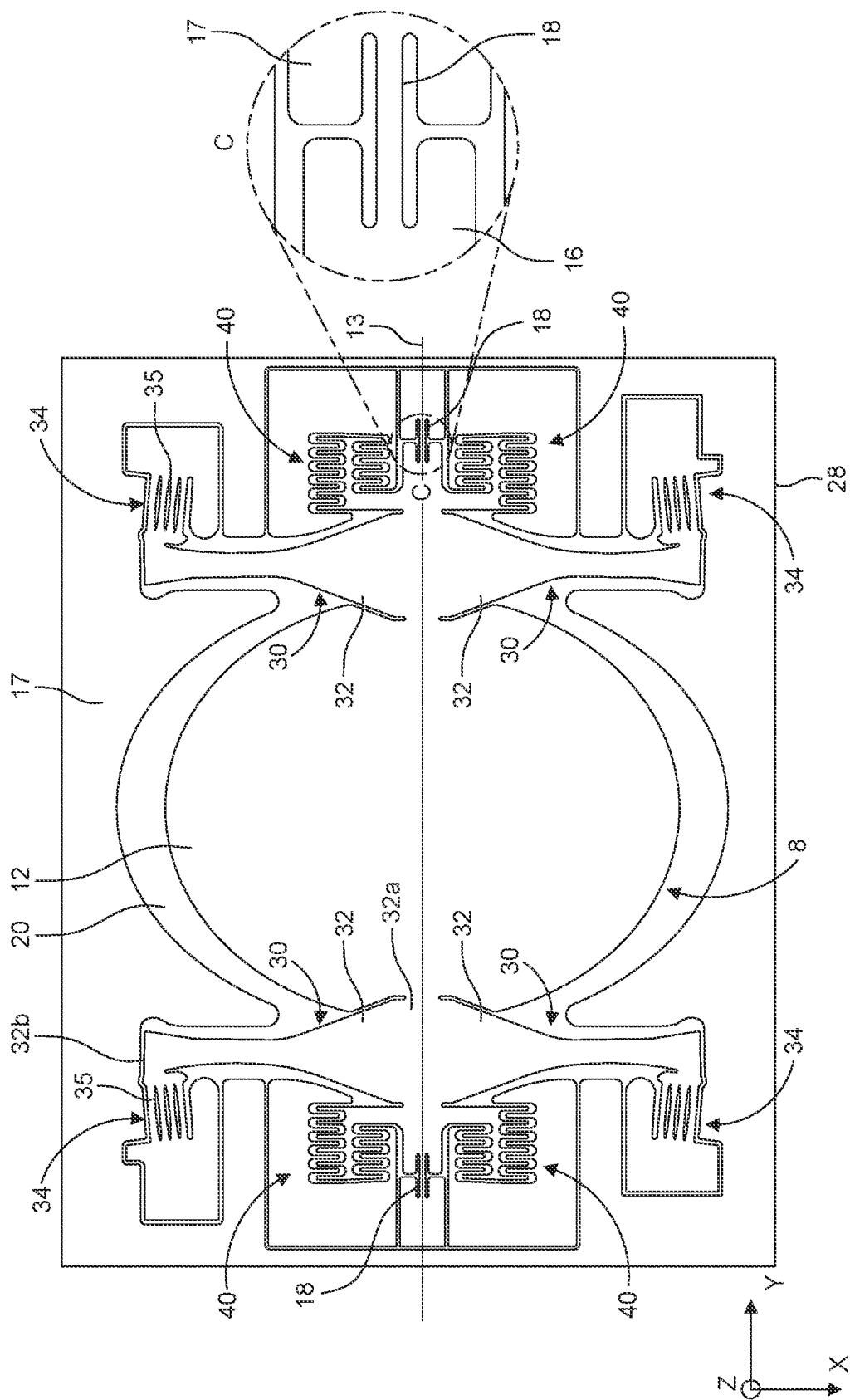
FIG. 1B shows a schematic top view of an example of a mirror device in accordance with one or more embodiments.

In order to achieve a high stiffness suspension, the mirror body may be supported in the mirror frame using support beams extending along the rotation axis and additional cantilever beam or leaf spring assemblies, as illustrated in FIG. 1B. Generally, as defined herein, leaf spring assemblies may be referred to a cantilever beam assemblies, and vice versa. Similarly, leaf springs and cantilever beams may be used interchangeably.

A cantilever beam assembly may have a longitudinal direction and may extend within the plane defined by the frame. The support beams may be connected between the mirror body and the frame at two opposite ends of the mirror body along the rotation axis. The cantilever beam assembly may have a cantilever beam coupled at a first end via a relief structure to the mirror frame and fixed at a second end to the mirror body. The cantilever beam may have a thickness, perpendicular to a plane of the frame, that is smaller than its width in the plane of the frame.

Results of the low inertia and the high suspension stiffness of the mirror body may be high resonance frequencies a good dynamic performance. These properties may also make the device which is operated at the resonance frequency around the main axis of rotation very fast. In normal operation, i.e., at resonance, accelerations at the mirror tips of typically 10000 G may be achieved. This may make any external vibration negligible.

The MEMS mirror 12 exhibits a non-linear behavior due the stiffness of the suspension structure (i.e., the cantilever beams) such that an oscillation frequency of the mirror increases with an increase in oscillation amplitude (i.e., tilt angle amplitude) in a non-linear manner. Thus, the stiffening of the suspension causes the MEMS mirror 12 to be more strongly non-linear.

Figure 2:
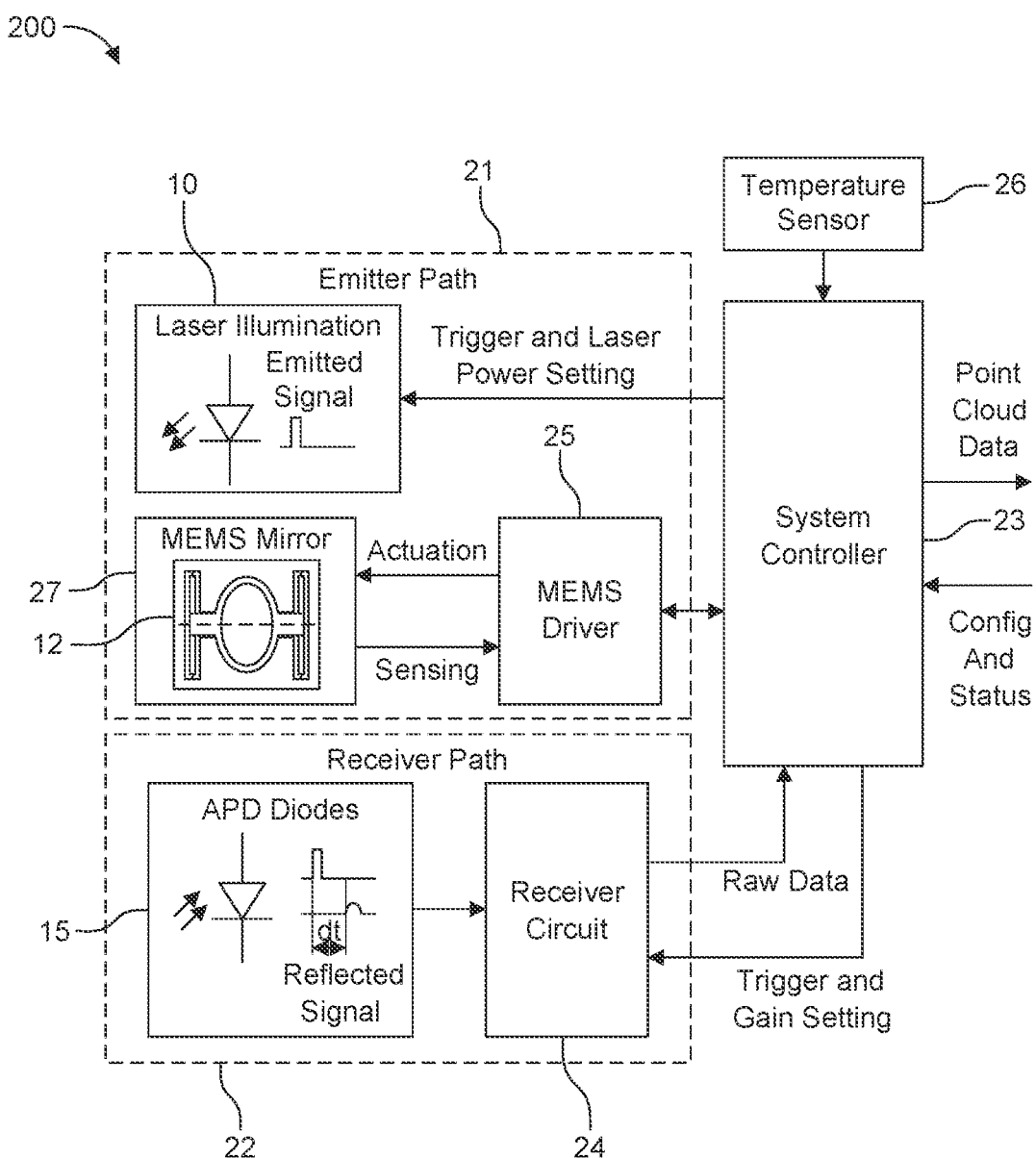
FIG. 2 is a schematic block diagram of the LIDAR scanning system in accordance with one or more embodiments.

The MEMS mirror 12 may be assembled in a chip package 27 shown in FIG. 2 to protect the mirror. For example, the MEMS mirror 12 may be hermetically sealed at a low pressure (i.e., at a pressure lower than atmospheric pressure) in a chip package. This low pressure may provide a low damping environment in which the MEMS mirror 12 operates.

Conceivable packages may include or differ by one or more of the following variants: different substrates (e.g., metal (leadframe), ceramic, organic (similar to printed circuit board (PCB) material)), and different optical lids or covers (e.g., optical material of glass, silicon, sapphire, etc.). Furthermore, the optical lids or covers may be cavity-forming caps, may be integrated into a frame (e.g., a metal frame), or assembled onto a pre-mold cavity or a ceramic cavity.

One or more methods (e.g., adhesive bonding, gluing, soldering, welding, and the like) or one or more different materials (e.g., silicone, glass solder, AuSn, and the like) may be used to bond one or more elements together (e.g., joining cap or lid to substrate). It will be appreciated that bonding methods may be interchangeable across various embodiments disclosed herein.

Alternatively, a wafer-level approach may be used such that a cavity-shaped lid may be directly mounted onto the MEMS chip (or even on wafer-level prior to singulation). Here, if the lid attachment leaves the electrical pads exposed, the sub-mount chip/lid can further be processed into a package using molding or casting processes.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Thus, a 1D oscillating MEMS mirror is by design more robust against vibrations and shocks than 2D MEMS mirror solutions. Due to this single scanning axis of rotation, the MEMS mirror 12 is referred to as a 1D MEMS mirror or 1D MEMS scanner. While embodiments describe using 1D oscillating MEMS mirrors, the synchronization methods described herein can be extended to 2D MEMS mirrors as well. In this case, both axes of a single 2D MEMS mirror are controlled by a different phase-locked loops (PLLs) such that a first scanning direction of the 2D MEMS mirrors according to a first axis are synchronized according to any of the synchronization techniques described herein, and a second scanning direction of the 2D MEMS mirrors according to a second axis are synchronized according to any of the synchronization techniques described herein. It is further possible that the different PLLs are provided in separate MEMS drivers or integrated into a single MEMS driver for each 2D MEMS mirror.

The MEMS mirror 12 itself is a non-linear resonator (i.e., a resonant MEMS mirror) configured to oscillate "side-to-side" about a single scanning axis 13 at a resonance frequency such that the light reflected from the MEMS mirror 12 (i.e., the vertical scanning line of light) oscillates back and forth in a horizontal scanning direction. The MEMS mirror 12 is more strongly non-linear due to the stiffening of the suspension. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate at a resonance frequency of 2 kHz, between +/−15 degrees to steer the light over +/−30 degrees making up the scanning range of the field of view. Thus, the field of view may be scanned, line-by-line, by a rotation of the MEMS mirror 12 through its degree of motion. One such sequence through the degree of motion (e.g., from −15 degrees to +15 degrees) is referred to as a single scan or scanning cycle.

Multiple scans may be used to generate distance and depth maps, as well as 3D images by a processing unit.

While the transmission mirror is described in the context of a MEMS mirror, it will be appreciated that other 1D mirrors can also be used. In addition, the resonance frequency or the degree of rotation is not limited to 2 kHz and +/−15 degrees, respectively, and both the resonance frequency and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector detector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line is shown as a vertical column of light that extends along one of the pixel columns in a lengthwise direction of the pixel column. The receiving line has three regions that correspond to the vertical scanning line SL shown in FIG. 1A. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. In other embodiments, the photodetector array 15 may be a 1D array that includes a single column of photodiodes. The activation of the photodiodes may be synchronized with light pulses emitted by the illumination unit 10. Alternatively, a single photo detector call/pixel, as opposed to an array, may be used. For example, a single photo detector call/pixel may be used in case of a 2×1D scanning transmitter in a coaxial LIDAR architecture.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by an APD of the APD array 15. The APD emits a short electrical pulse which is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror, an area (i.e., a field of view) can be scanned, a three-dimensional image can be generated, and objects within the area can be detected.

Alternatively, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

It will be appreciated that the above-described horizontal scanning system 100 may also be used for vertical scanning. In this case, the scanning arrangement is arranged such that the scanning direction is rotated 90° such that the scanning line SL and the receiving line RL move in the vertical direction (i.e., from top to bottom or from bottom to top). As such, the scanning line is a horizontal scanning line SL that is projected into the field of view that moves vertically across the field of view as the transmission mirror oscillates about the single scanning axis. Furthermore, as the horizontal scanning line SL moves vertically across the field of view, the horizontal column of light RL incident on the 2D photodetector array 15 also moves vertically across the 2D photodetector array 15.

It will be further appreciated that a LIDAR scanning system may include multiple scanning mirrors 12 and corresponding circuitry for scanning different field of views in the horizontal and/or vertical direction. For example, a vehicle may include multiple scanning mirrors arranged at different locations on the vehicle to scan different field of views. Alternatively, the synchronized MEMS mirrors can be used in a 2×1D system, such as a Lissajous scanning system. In this case, the MEMS mirrors are mounted in the same location in the vehicle and are configured to scan a same field of view.

FIG. 1B shows a schematic top view of an example of a mirror device in accordance with one or more embodiments. Referring to FIG. 1B, an example of a mirror device, such as a MEMS scanning micro mirror, is now explained. The mirror device comprises a mirror body 8. The mirror body 8 comprises a mirror 12 and a mirror support 16. The mirror device further includes a frame 17. The mirror body 8 is arranged in the frame 17. The frame 17 defines a plane, i.e., the (x, y) plane in FIG. 1B. The plane defined by the frame 17 may be parallel to planes defined by main surfaces of a layer or a plurality of layers in which the frame 17 is formed.

The mirror body 8 is rotatable around a rotation axis 13 extending in the plane de-fined by the frame 17. Support beams 18, which may also be referred to as torsion beams, are connected between the mirror body 8 and the frame 17 along the rotation axis 13. To be more specific, a first support beam 18 is connected between a first end of the mirror body 8 and the frame 17 and a second support beam 18 is connected between a second end of the mirror body 8 and the frame 17, where the second end of the mirror body 8 is opposite to the first end in the direction of the rotation axis 13. An enlarged view of one of the support beams 18 is shown in the enlarged portion C in the right hand side of FIG. 1B. As can be seen, support beams 18 connect parts of mirror support 16 to parts of frame 17 and permit the mirror body 8 to be rotated around rotation axis 13. The support beams 18 may be collinear with the rotation axis 13.

Those skilled in the art will appreciate that the shape of the mirror 12 can be any shape desired for a particular application, e.g., a circle, ellipse, square, rectangle or other shape as desired.

The mirror frame 17 defines a mirror recess 20 in which the mirror body 8 is arranged. The mirror recess 20 is defined by a recess periphery 28 of the mirror frame 17. The mirror frame 17 may also be structured to define further recesses in which other components may be arranged, such as actuators and leaf spring assemblies.

The mirror device includes at least one leaf spring assembly 30. In the example shown, the mirror device includes two pairs of leaf spring assemblies 30, where the leaf spring assembly in each pair extends from the mirror body 8 in opposite directions. In the example shown, the leaf spring assemblies 30 are arranged symmetrically with respect to the axis of rotation 13.

The at least one leaf spring assembly 30 includes a leaf spring 32 and a relief link 34. The relief link 34 may have one or more relief springs 35. The leaf spring 32 includes a first end 32a and a second end 32b. The first end 32a is coupled to the mirror body 8 and the second end is coupled to the frame 17. Each leaf spring 32 has a longitudinal direction or extension between the first end 32a and the second end 32b. The first end 32a is fixed to the mirror support (not illustrated) and the second end 32b is coupled to frame 17 via the relief link 34. In the examples, the first ends 32a of two leaf springs 32 extending from the same portion of the mirror body 8 in different directions may be connected to each other (e.g., the leaf springs of the left side of the mirror 12 or the leaf springs on the right side of the mirror 12).

In some examples, the shape of the mirror 12 may include concave portions in the region of the axis of rotation 13, wherein portions of the leaf springs 32 extend into the concave portions of the mirror 12. In some examples, leaf springs 32 and mirror 12 may be formed in a same layer of material and may be connected to each other adjacent the axis of rotation 13.

In some examples, the leaf springs 32 may be implemented in a single crystal silicon layer having a direction of lower material stiffness, where the leaf springs have their longitudinal direction aligned with the direction of lower material stiffness. In some examples, the leaf springs 32 may be implemented in a silicon layer having a <100> axis and the leaf springs have their longitudinal direction aligned with the <100> direction which in this case has the lower material stiffness.

Torsional stiffness about the rotation axis 13 may be set using the leaf spring assemblies 30. The pair of support beams 18 supports the mirror body 8 vertically, i.e., perpendicular to a main surface of the frame 17, at the rotation axis 13. However, the support beams 18 may have a negligible effect on the torsional stiffness, so that the natural frequency of the mirror body may be substantially determined by the leaf spring assemblies 30. The natural frequency may be substantially independent of the support beams 18. The natural frequency as defined herein is the undamped frequency of the mirror body 8 (i.e., the mirror 12) about its rotation axis 13. The support beams 18 may define the out-of-plane rocking and vertical mode stiffness for the corresponding dynamic modes and corresponding resonance frequencies. The torsional stiffness can be decoupled from the out-of-plane rocking and vertical mode stiffness so that the out-of-plane rocking and vertical mode frequencies can be set to desired values, such as higher values, without influencing the torsional mode stiffness and resonance frequency. As defined herein, the Y axis is along the rotation axis 13, the X axis is perpendicular to the Y axis on the mirror plane when the mirror 12 is at rest, and the Z axis is perpendicular to and out of the mirror plane when the mirror 12 is at rest. The X, Y, and Z axis are axes of a tree dimensional Cartesian coordinate system.

In the example shown in FIG. 1B, one end of the at least one leaf spring 32 is connected to the mirror body 8 at a location close to the rotation axis 13. The other end 32b is connected to the associated relief link 34 at a location further away from the rotation axis 13. The leaf spring assemblies 30 may provide torsional stiffness to the mirror body 8 about the rotation axis 13. The relief links 34 may provide a compliant or flexible coupling from the leaf springs 32 to the frame 17. The relief links 34 may have a relatively low stiffness longitudinal to the leaf springs 32, i.e., in X direction in FIG. 1B, which allows one end of the leaf springs 32 to move in their longitudinal direction when the mirror body 8 rotates around the rotation axis 13. The relief links 34 may have a relatively high stiffness in the transverse direction, i.e., in Z direction and in Y direction in FIG. 1B.

The resonance frequency for rotation of the mirror 12 around the rotation axis 13 may be defined mainly by the inertia of the mirror body 8 and the stiffness of the leaf spring assemblies 30, which may be defined by the bending stiffness of the leaf springs 32 and by the torsional and translational stiffness of the relief links 34. The bending stiffness of the leaf springs 32 may be defined by the length, width, and, in particular, the thickness of the leaf springs 32. The combined stiffness in X direction of the support beams 18 and the relief links 34 may prevent movement of the mirror body 8 perpendicular to the rotation axis 13 (in the X direction) during operation. More detail on the relief links is provided below.

The support beams 18 are connected between the frame 17 and the mirror body 8 along the rotation axis 13 to support the mirror body 8 in the frame 17. In one example, the support beams 18 have narrow rectangular cross-sections perpendicular to the rotation axis 13, with the long axis of the rectangle perpendicular to the face of the mirror 12 and the mirror body 8, and the short axis of the rectangle parallel to the face of the mirror 12. The torsional stiffness corresponding to a rotation of the mirror body 8 around rotation axis 13 may be provided by the leaf spring assemblies 30. The support beams 18 may serve only for support of the mirror body 8 and may have a negligible effect on the torsional stiffness. The support beams 18 may be sized so that the stiffness against vertical displacement (in Z direction) of the mirror body 8 and against its out-of-plane translation perpendicular to the rotation axis 13 (the X axis) may be as high as possible.

The mirror device may also include at least one actuator 40 to provide torque to drive the mirror body 8 about the rotation axis 13. In one example, the actuator may include mirror combs attached to the mirror body 8 interleaved with frame combs attached to the frame 17. Applying a difference in electrical potential between interleaved mirror combs and frame combs may create a driving force between the mirror combs and the frame combs, which may create a torque on the mirror body 8 about the rotation axis 13. An oscillating electrical potential can be applied to drive the mirror device at its natural frequency.

In other examples, actuation methods may include electromagnetic actuation and piezoelectric actuators. In electromagnetic actuation, the micro mirror may be "immersed" in a magnetic field and an alternating electric current through conductive paths may create the oscillating torque around the rotation axis 13. Piezoelectric actuators may be integrated in the leaf springs or the leaf springs may be made of piezoelectric material to produce alternating beam bending forces in response to an electrical signal and generate the oscillation torque.

The MEMS mirror 12 exhibits a non-linear behavior due the torsional stiffness about the rotation axis 13 caused by the leaf spring assemblies 30 such that an oscillation frequency of the mirror 12 increases with an increase in oscillation amplitude (i.e., tilt angle amplitude) in a non-linear manner. Thus, the stiffening of the leaf springs 32 as the mirror rotates causes the MEMS mirror 12 to be more strongly non-linear.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry for processing data, as well as control circuitry, such as a microcontroller, that is configured to generate control signals. The LIDAR scanning system 200 may also include a temperature sensor 26.

The receiver unit 22 includes the photodetector array 15 as well as a receiver circuit 24. The receiver circuit 24 may include one or more circuitries or sub-circuitries for receiving and/or processing information. The receiver circuit 24 may receive the analog electrical signals from the APD diodes of the photodetector array 15 and transmit the electrical signals as raw analog data or raw digital data to the system controller 23. In order to transmit the raw data as digital data, the receiver circuit 24 may include an ADC and a field programmable gate array (FPGA). The receiver circuit 24 may also receive trigger control signals from the system controller 23 that triggers an activation of one or more APD diodes. The receiver circuit 24 may also receive gain setting control signals for controlling the gain of one or more APD diodes.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes (e.g., APD diodes) are activated to sense, and thus measure, a reflected light signal. Thus, a higher accuracy in position sensing of the MEMS mirror results in a more accurate and precise control of other components of the LIDAR system.

The MEMS driver 25 may also measure and record mirror frequency and currents using a change in capacitance in a comb-drive rotor and stator of an actuator structure used to drive the MEMS mirror 12. The actuator structure of the MEMS mirror 12 further includes the suspension structure discussed above. Thus, the MEMS driver 25 may further include a measurement circuit configured to measure one or more characteristics of the MEMS mirror 12 described herein. The MEMS driver 25 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

Additionally or alternatively, the system controller 23 may receive measurement information from the measurement circuit of the MEMS driver 25 and perform processing thereon. Thus, system controller 23 may further include processing circuitry, including at least one processor (e.g., analog signal processing circuitry and/or digital signal processing circuitry) configured to process measurement information from the measurement circuit to evaluate a mechanical health of the MEMS mirror 12 and/or the state of the chip package.

By sensing the rotation position of the MEMS mirror 12 about its rotation axis 13, the MEMS driver 25 can sense zero-crossing events of the MEMS mirror 12. A zero-crossing event is an instance when the MEMS mirror 12 has a rotation angle of 0° on its rotation axis 13. Specifically, it is the moment when the MEMS mirror 12 is parallel to the frame or in a neutral position. The neutral position may also be referred to as a resting position (e.g., when the MEMS mirror 12 comes to a stop after turning off the driving force). Since the MEMS mirror 12 oscillates back and forth between two rotation directions (e.g., clock-wise and counter-clockwise), a zero-crossing event occurs twice during a scanning period—once as the mirror oscillates in the first rotation direction and once as the mirror oscillates in the second rotation direction. It will also be appreciated that angle-crossing events at another predefined angle may also be used instead of a zero-crossing event.

In some embodiments, an event time may correspond to a non-zero crossing event. For example, the sensed rotation angle may be some angle other than 0°. However, for the purpose of explanation, examples herein will be described in the context of sensing zero-crossing events.

The MEMS driver 25 is configured to detect each zero-crossing event and record a timing for each event. This timing information (i.e., measured zero-crossing time) can then be transmitted to the system controller 23 as position information. Specifically, the MEMS driver 25 triggers a change in the output of a position signal (position_L) at each zero-crossing event or angle-crossing event.

Figure 10:
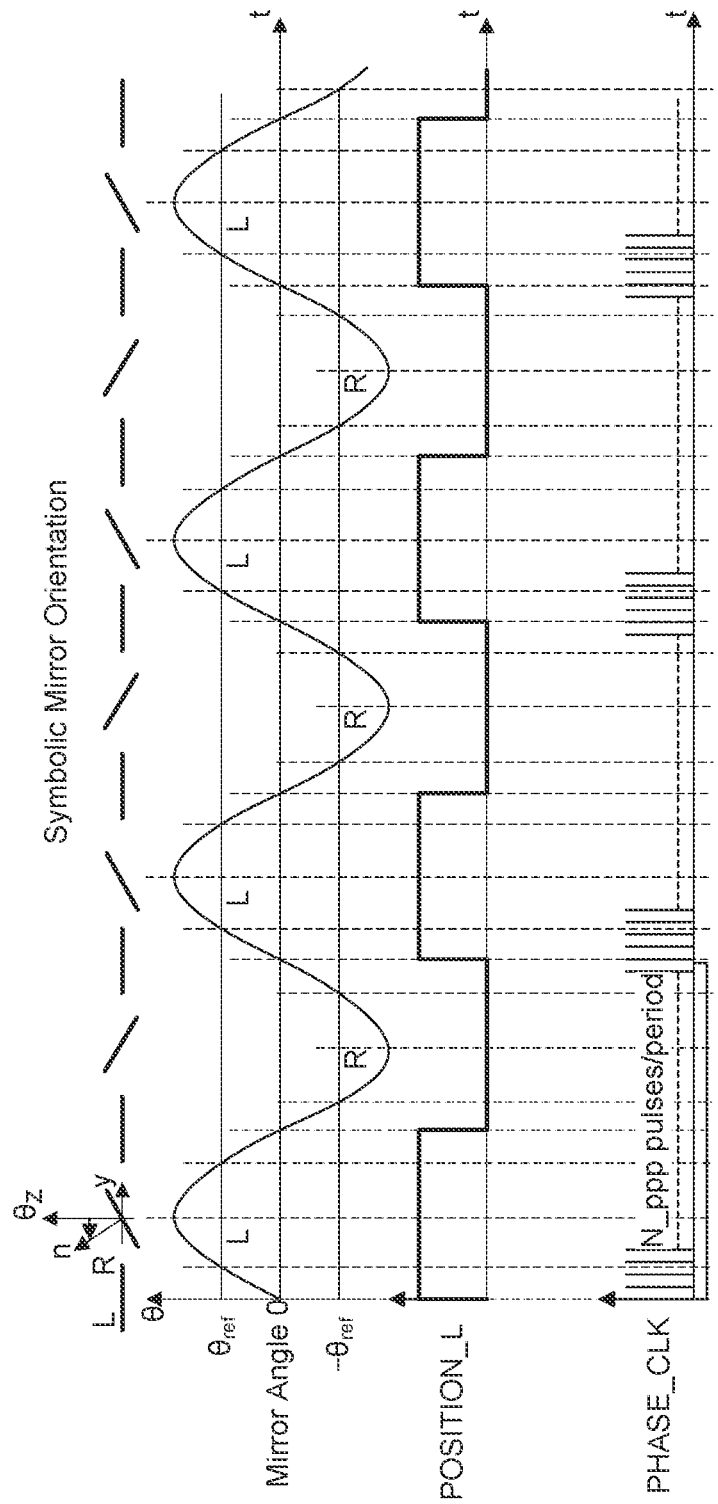
FIG. 10 illustrates a signal diagram of various signals generated by a MEMS driver based on a mirror angle $\theta$ and/or position according to one or more embodiments.

FIG. 10 illustrates a signal diagram of various signals generated by a MEMS driver 25 based on the mirror angle θ and/or position, including a position signal (position_L). For example, the position signal (position_L) may be a pulsed signal during which a first pulse transition (e.g., falling-edge transition) is triggered at a zero-crossing as the mirror oscillates in a first rotation direction (e.g., from left to right) and a second pulse transition (e.g., rising-edge transition) is triggered at a zero-crossing as the mirror oscillates in a second rotation direction (e.g., from right to left). Furthermore, the signal is "high" when the mirror points in one direction (e.g., points left) and the signal is "low" when the mirror points in a second direction (e.g., points right). Thus, the position signal not only indicates a zero-crossing event by triggering a pulse transition, but also indicates absolute phase information by indicating the directional tilt of the mirror. As the interval between zero-crossing events increase, so does the frequency of the position signal. Based on this position signal both a phase and/or a frequency of two or more position signals can be compared in the following embodiments.

Alternatively, a short pulse may be generated by the MEMS driver 25 at the each zero-crossing event such that a pulsed position signal (position_L) is output to the system controller 23. That is, the signal remains low (or high) between zero-crossing pulses. In this, case, the absolute phase information indication which direction the mirror is moving would be absent. Based on this position signal a phase and/or a frequency of two or more position signals can be compared in the following embodiments.

The MEMS driver 25 may send the position information to the system controller 23 so that the system controller 23 can use the position information to control the triggering of the laser pulses of the illumination unit 10 and the activation of the photodiodes of the photodetector array 15. The position information may also be used by the system controller as feedback information such that the system controller 23 can maintain a stable operation of the MEMS mirror 12 via control signals provided to the MEMS driver 25 and also maintain synchronization with other MEMS mirrors.

The timing information of the zero-crossing events may also be used by the MEMS driver 25 to generate a phase clock signal (Phase_CLK). The phase clock signal is a high frequency signal (e.g., 14 MHz) of a fixed number of pulses that provides fine-grained phase information of the MEMS mirror 12. In this case, the mirror movement is divided into equidistant slices (affected by quantization errors of a digitally controlled oscillator (DCO) frequency generator) in the time-domain. A "slice" may be regarded as a subsection of a time interval between two consecutive zero-crossing events. Specifically, the time interval between two zero-crossing events (i.e., between two Position_L signals or pulses) is divided into identical fractions such that a signal pulse is generated at each fraction. Thus, the phase clock signal is pulse signal whose frequency depends on the time interval between two zero-crossing events, where the shorter the time interval, the higher the frequency. Thus, the phase clock signal divides the mirror movement in a well-defined number of phase-slices. The MEMS driver 25 may generate and output the phase clock signal to the system controller 23.

FIG. 10 further illustrates a phase clock signal (Phase_CLK) comprising a number of pulses per oscillation period, where the oscillation period is defined by a time interval between two consecutive zero-crossing events.

The MEMS mirror 12 includes an actuator structure used to drive the mirror. The actuator structure includes interdigitated finger electrodes made of interdigitated mirror combs and frame combs to which a drive voltage (i.e., an actuation signal) is applied by the MEMS driver 25. The drive voltage may be referred to as a high-voltage (HV). The drive voltage applied to the finger structure generates a corresponding capacitance. The drive voltage across the finger structure creates a driving force between interdigitated mirror combs and the frame combs, which creates a torque on the mirror body about the rotation axis. The drive voltage can be switched or toggled on and off resulting in an oscillating driving force. The oscillating driving force causes the mirror to oscillate back and forth on its rotation axis between two extrema. Depending on the configuration, this actuation can be regulated or adjusted by adjusting the drive voltage off time, a voltage level of the drive voltage or a duty cycle.

In other embodiments, an electromagnetic actuator may be used to drive the MEMS mirror 12. For an electromagnetic actuator, a driving current (i.e., an actuation signal) may be used to generate the oscillating driving force. Thus, it will be appreciated that drive/driving voltage and drive/driving current may be used interchangeably herein to indicate an actuation signal, and both may generally be referred to as a driving force.

As the mirror oscillates, the capacitance between the finger electrodes changes according to the mirror's rotation position. The MEMS driver 25 is configured to measure the capacitance between the interdigitated finger electrodes, and determine a rotation position or angle position of the MEMS mirror 12 therefrom. By monitoring the capacitance, the MEMS driver 25 can detect the zero-crossing events and a timing thereof, and can determine the tilt angle of the MEMS mirror 12. The MEMS driver 25 can also use the measured capacitance to determine a mirror frequency, and record the information in memory at the MEMS driver 25 or at the system controller 23.

The sensing of the position of the MEMS mirror 12 is performed based on a detector that is configured to measure the capacitance. For example, as the MEMS mirror moves, the geometry of the finger structure changes, resulting in a change in the geometry of the capacitance. As the geometry of the capacitance changes, the capacitance itself changes. Thus, a specific capacitance corresponds directly with a specific position (i.e., tilt angle) of the MEMS mirror. By sensing the capacitance of the finger structure, the MEMS driver 25 can monitor and track the oscillations of the mirror, and determine a specific position of the MEMS mirror, including the zero-crossing.

One way to measure the capacitance is to measure a current flowing through the finger structure, convert the measured current into a voltage, and then further correlate the voltage to a capacitance and/or a rotation angle. However, any method to measure the capacitance may be used. A rotation direction (e.g., positive or negative, left-to-right or right-to-left, clockwise or counter-clockwise, etc.) is also detected by measuring a change in capacitance over time, where a positive or a negative change indicates opposing rotation directions. The MEMS driver 25 can also record the currents and voltages measured during the measuring of the capacitance. Thus, increasing the accuracy of position sensing of the mirror may improve the overall accuracy of the LIDAR system Since the mirror is driven at an oscillation frequency (e.g., 2 kHz), when the mirror rotates in a first rotation direction (e.g., left-to-right or clockwise), it crosses a zero position (i.e., 0°) at a certain point of time. The same can be said when the mirror rotates in a second rotation direction (e.g., right-to-left or counter-clockwise), the mirror will cross the zero position at a certain point in time. These instances of crossing the zero position may be referred to as zero-crossing events which occur at zero-crossing times.

Figure 3:
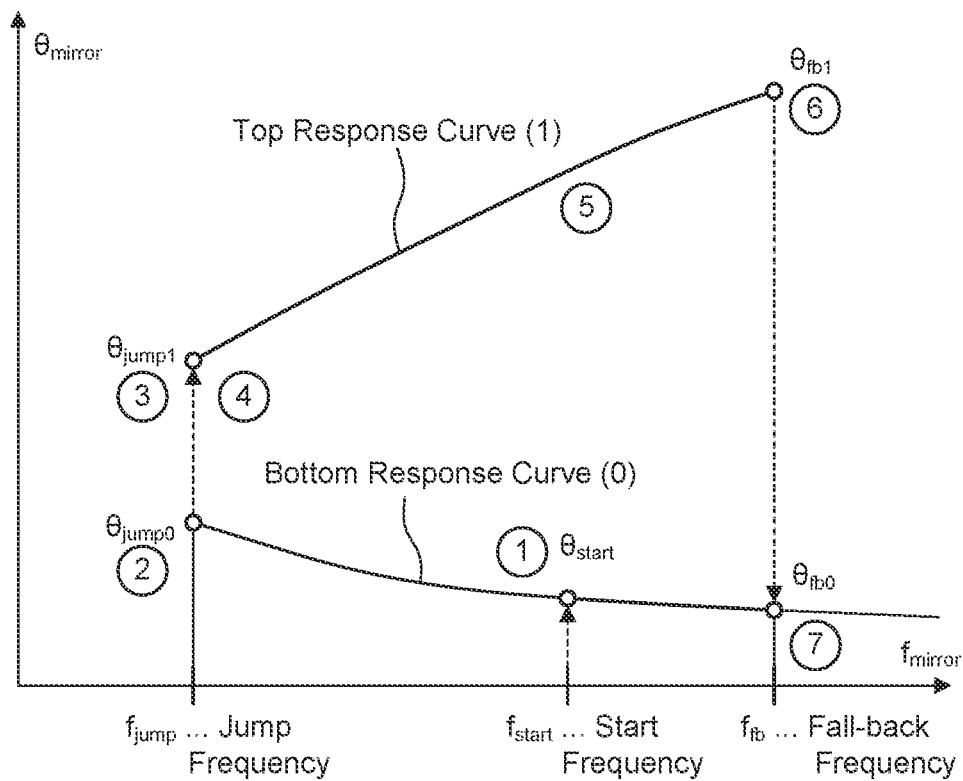
FIG. 3 illustrates a complete response curve of a micromirror device according to one or more embodiments.

FIG. 3 illustrates a complete response curve of a micromirror device according to one or more embodiments. Specifically, FIG. 3 plots the mirror angle $\theta_{mirror}$ vs. the mirror frequency $f_{mirror}$ of the MEMS mirror 12. Both axes in the plot are in arbitrary units. The complete response curve includes a top response curve (1) and a bottom response curve (0). The top response curve (1) may also be referred to as an operating response curve, where the frequency is swept across the operating range. In contrast, the bottom response curve (0) may be referred to as a non-operating response curve that exists before amplitude operating range is achieved. The complete response curve may be measured and stored in memory of the LIDAR system 200 (e.g., in the system controller 23).

The flow of the operation of the MEMS mirror progresses from point 1 to point 7, during which constant drive voltage is applied to the MEMS mirror 12 by the MEMS driver 25, will now be described. Here, "constant drive voltage" refers to the drive voltage being the same voltage when actuated (i.e., toggled on). However, it will be understood that the drive voltage is being toggled on and off in order to produce the mirror oscillation.

As noted in the previous paragraph, all points on the graph are operating at the same drive voltage provided by the MEMS driver 25. The drive voltage only stretches or compresses the curve (i.e., a higher frequency and a higher tilt angle can be reached due to more energy put it by a higher drive voltage).

The operation of the MEMS mirror starts at point 1 on the bottom response curve (0) where, at start frequency $f_{start}$. Here, the MEMS driver 25 starts the drive voltage signal to the MEMS mirror 12. In response, the MEMS mirror 12 will start to move a bit (e.g., at a low angle), depending on the value of $f_{start}$. Starting at the start frequency $f_{start}$, the mirror frequency is swept down (i.e., decreasing, right to left).

The frequency is lowered in order for the mirror to synchronize with the drive signal provided (i.e., to decrease the phase offset between the two). As more energy (i.e., constant drive voltage) is applied over time, the mirror continues to move slightly outside of resonance until the jump frequency $f_{jump}$ (point 2). That is, the mirror frequency continues to be lowered until an instability point is found and the amplitude of the mirror oscillation increases at point 2 (180 phase shift, hence jump). At the jump frequency, the mirror phase shifts 180 degrees from $\theta_{jump0}$ (point 2) to $\theta_{jump1}$ (point 3) where the energy put in is transferred into motion.

At point 4, and the mirror frequency $f_{mirror}$ starts to sweep up (i.e., increasing, left to right). The mirror phase may continue to increase along the top response curve. At point 5, the mirror is in a stable operating region (in phase, but offset). The mirror may be in an optimal resonance at point 5. However, if the mirror frequency continues to increase to point 6, the mirror phase reaches a fallback phase $0=\theta_{fb1}$ at a fallback frequency $f_{fb}$. Thus, the tilt angle of the mirror is at a maximum just prior to this tipping point at point 6.

The fallback frequency $f_{fb}$ is the maximum frequency the mirror can maintain at the established drive voltage. The fallback point or tipping point is the point where the potential energy put in the mirror system by the drive voltage is equal to the kinetic energy opposing it by the mirror system (in phase, no offset), pushing it over this point disturbs the balance and resonance is lost. Thus, at point 6, there is not enough energy in the system to maintain the mirror phase and the phase shifts 180 degrees and falls back to the bottom response curve (0) at fallback phase $\theta_{fb0}$.

Point 7 is the fallback point on the bottom response curve (0) and is the phase angle the mirror falls back to. This phase angle is not necessarily zero degrees since the drive voltage is still present, but the mirror is no longer in phase. The cycle can start again at point 7 or at point 1.

As noted above, a LIDAR scanning system may include multiple scanning mirrors 12 on the system level (i.e., not on an integrated level) and corresponding circuitry for scanning different field of views in the horizontal and/or vertical direction. For example, a vehicle may include multiple scanning mirrors arranged at different locations on the vehicle to scan different field of views. Thus, it may be desirable to synchronize two or more MEMS mirrors on a system level.

Embodiments include phase synchronization between one master MEMS mirror and a slave MEMS mirror, coarse frequency synchronization between one master MEMS mirror and a slave MEMS mirror, and fast-reacting frequency synchronization between one master MEMS mirror and a slave MEMS mirror. Thus, two or more mirrors are synchronized on a system-level in terms of having the same phase and the same frequency. In the alternative to a synchronizing on a system-level, the synchronization control may be integrated into the MEMS drivers, where one MEMS driver is configured to be the master and the other MEMS driver to be the slave. In this case, the two MEMS drivers integrate a portion of the system controller 23 used for mirror synchronization are configured to communicate with each other via one or more signal paths.

Figure 4:
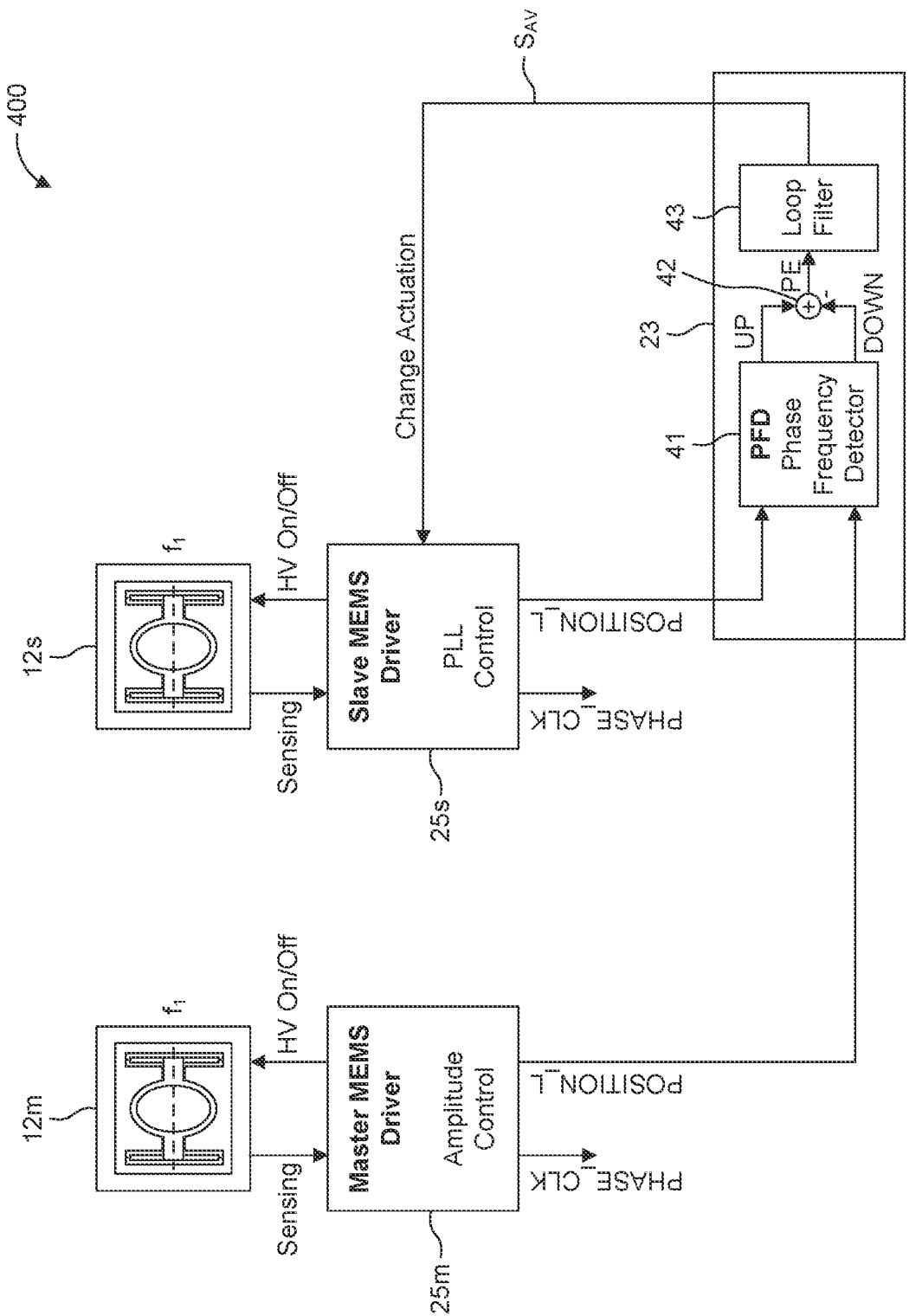
FIG. 4 illustrates a schematic block diagram of a scanning system according to one or more embodiments.

FIG. 4 illustrates a schematic block diagram of a scanning system 400 according to one or more embodiments. The scanning system 400 includes a master MEMS mirror 12*m*, a master MEMS driver 25*m* operably coupled to the master MEMS mirror 12*m*, a slave MEMS mirror 12*s*, a slave MEMS driver 25*s* operably coupled to the slave MEMS mirror 12*s*, and a system controller 23 (i.e., a synchronization controller) operatively coupled to the master MEMS driver 25*m* and the slave MEMS driver 25*s*. The MEMS mirror 12*m* and the slave MEMS mirror 12*s* have a similar configuration to MEMS mirror 12 described in FIG. 2. Similarly, the master MEMS driver 25*m* and the slave MEMS driver 25*s* have a similar configuration to MEMS driver 25 described in FIG. 2.

The scanning system 400 employs phase/frequency synchronization between master and slave MEMS mirrors. The master MEMS mirror 12*m* is operated in both PLL control mode, where position information of the driver 25*m* precisely follows the movement of the MEMS mirror 12*m*, and amplitude control mode, where the maximum oscillation or tilt angle of the MEMS mirror 12*m* is controlled in order to stay constant. The slave MEMS mirror is operated in PLL control mode only.

Master mirror 12*m* runs in amplitude control mode during which the master MEMS driver 25*m* maintains an oscillation of the mirror 12*m* such that a predetermined (fixed) oscillation amplitude (i.e., maximum tilt angle) is maintained. For example, the maximum oscillation amplitude may be set at +/−15 degrees and the master MEMS driver 25*m* is configured to drive the mirror 12*m* at the oscillation amplitude. In order to maintain the oscillation amplitude, the mirror frequency of the mirror 12*m* may vary due to non-linearities, change in temperature, and other factors.

The master MEMS driver 25*m* provides two output signals: a phase clock signal (Phase_CLK) and a position signal (Position_L) as previously described in reference to the MEMS driver 25 of FIG. 2.

In contrast, the slave mirror 12*s* runs in a phase-locked loop (PLL) control mode with no amplitude control during which its oscillation amplitude is variable, its mirror frequency is variable, and its phase is fixed to the phase of the master mirror 12*m*. That is, the phase of the slave mirror 12*s* is synchronized with the phase of the master mirror 12*m* via the system controller 23. In PLL control mode, the slave mirror 12s is only concerned with following the phase according to the position signal. As a result, the oscillation amplitude, for example, may vary slightly from the fixed oscillation amplitude of the master mirror 12m. Selection of which MEMS mirror should be the master and which should be the slave in any arbitrary pair of MEMS mirrors could be done with the following procedure: at first run both MEMS mirrors in the amplitude control mode and select the master MEMS as the one with a lower frequency. This will automatically guarantee that the slave MEMS will have lower amplitude at the same frequency if when running in sync mode with the master due to a linear frequency-amplitude response curve.

Thus, a multi-mirror system includes a first mirror configured to oscillate about a first axis; a second mirror configured to oscillate about a second axis, wherein a first one of the first mirror and the second mirror is configured as a master mirror and a second one of the first mirror and the second mirror is configured as a slave mirror; a first driver configured to drive an oscillation of the first mirror, measure a first frequency of the first mirror, and generate a first measurement signal that indicates the first frequency; a second driver configured to drive an oscillation of the second mirror, measure a second frequency of the second mirror, and generate a second measurement signal that indicates the second frequency; and a system controller 23 configured to receive the first measurement signal and the second measurement signal, compare the first measurement signal with the second measurement signal to generate a comparison result indicating which of the first and the second mirrors has a lower frequency, and select one of the first mirror or the second mirror as the master mirror having the lower frequency indicated by the comparison result.

Similar to the master MEMS driver 25m, the slave MEMS driver 25s provides two output signals: a phase clock signal (Phase_CLK) and a position signal (Position_L) as previously described in reference to the MEMS driver 25 of FIG. 2. For simplicity, the phase clock signal and the position signal generated by the master MEMS driver may be referred to as master feedback signals and the phase clock signal and the position signal generated by the slave MEMS driver may be referred to slave feedback signals.

In general, a phase detector (PD) detects the phase difference at its inputs and generates corresponding up and down outputs to control charge pumps. A PD is normally able to work when two input signals have a very small frequency difference. Once the frequency difference gets large enough, another frequency-locked loop or a phase-frequency detector (PFD) is used to perform phase and frequency comparisons, which then generates corresponding up and down outputs to control charge pumps. In general, a PFD can offer a larger acquisition range than a simple PD.

In addition, frequency detectors (FD) may be used. It will be appreciated that a PD, PFD, or FD may be interchanged with one another to detected at least one or a frequency difference or a phase difference between two signals depending on the need of the application (e.g., depending on whether phase and frequency alignment is desired, or if solely phase or frequency alignment is sufficient). Thus, these elements may generally be referred to as difference detectors or synchronization detectors, since they ultimately detect whether or not two signals are in synchronization by identifying a frequency and/or phase difference therebetween.

The system controller 23 includes a PFD 41 that is configured to receive the master and the slave position signals from the master MEMS driver 25m and the slave MEMS driver 25s, respectively. In particular, the PFD 41 receives both position signals after both MEMS mirrors 12m and 12s are driven to their upper resonance curves (i.e., the master mirror in PLL and amplitude control modes, and the slave mirror in PLL control mode only). Based on the two position signals, the PFD 41 determines whether the frequency of the slave mirror 12s is faster, slower, or equal to the frequency of the master mirror 12m. In particular, the PFD 41 includes logic that evaluates the phase and the frequency of both position signals, and determines which of the two position signals has a zero-crossing earlier or more often (e.g. which has a higher frequency) and adjusts a phase error signal PE based on the determination.

For example, the PFD 41 may generate either an "up" control pulse or a "down" control pulse and provides the respective control pulse to a phase error signal generator 42. In response to receiving an up control signal, the phase error signal generator increments a value of the phase error signal. Conversely, in response to receiving a down control signal, the phase error signal generator decrements the value of the phase error signal. The phase error signal indicates the phase relationship between the two mirrors 12m and 12s.

For instance, the phase error signal may be a positive value if the slave mirror is operating slower than the master mirror, thus indicating that the phase/frequency of the slave mirror should be increased. Alternatively, the phase error signal may be a negative value if the slave mirror is operating faster than the master mirror, thus indicating that the phase/frequency of the slave mirror should be decreased. Alternatively, the phase error signal may be a zero if the phase of the slave mirror is matched with the phase of the master mirror, thus indicating that the current phase/frequency of the slave mirror should be maintained unchanged.

The system controller 23 further includes a proportional-integral-derivative (PID) loop filter 43 that is configured to receive the phase error signal PE, and sets an actuation value $S_{AV}$ (e.g., a drive voltage off timing or a voltage level of the drive voltage) based on the phase error signal PE. The activation value $S_{AV}$ serves as a configuration setting to the slave MEMS driver 25s. The loop filter 43 then provides the actuation value Say to the slave MEMS driver 25s, which generates an actuation signal based on the actuation value $S_{AV}$ received from the loop filter 43.

The actuation signal is provided to the slave MEMS mirror 12s to control the phase/frequency of the mirror oscillation such that the phase and frequency are matched with that of the master MEMS mirror 12m. Thus, the output of the loop filter 43 defines the actuation of the slave mirror 12s. In turn, the slave MEMS mirror 12s either speeds up or slows down in order to achieve synchronization with the master MEMS mirror 12m. As a result, the slave mirror 12s follows the frequency and the phase of the master mirror 12m.

Phase synchronization between a master and one or more slave mirrors can be used, for example, in a scanning emitter and scanning receiver systems.

Figure 5:
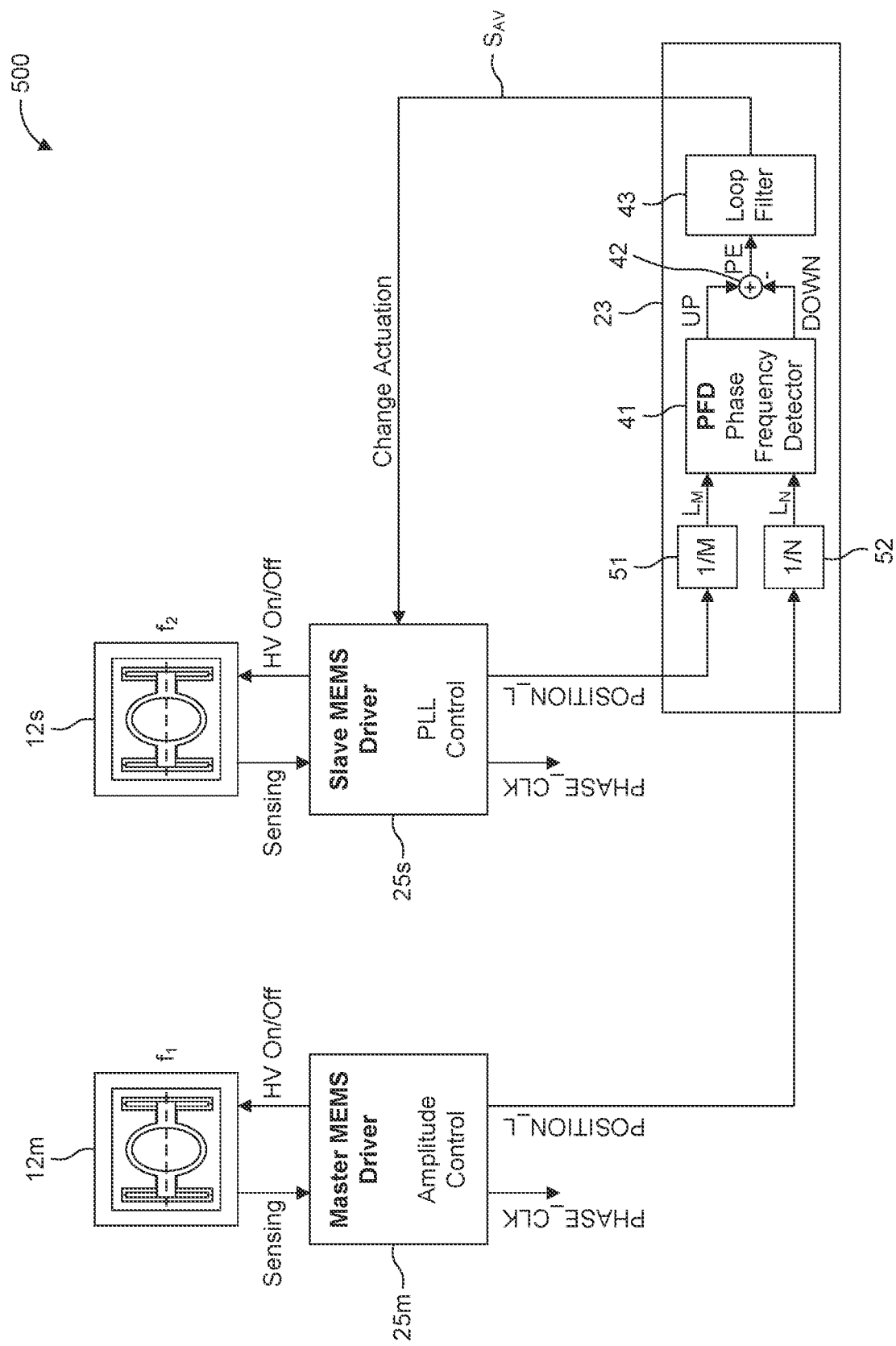
FIG. 5 illustrates a schematic block diagram of another scanning system according to one or more embodiments.

FIG. 5 illustrates a schematic block diagram of a scanning system 500 according to one or more embodiments. The scanning system 500 is similar to the scanning system 400 provided in FIG. 4, with the exception that the scanning system 500 provides coarse proportional frequency synchronization between a master mirror 12m and a slave mirror 12s.

In this example, the oscillation of the master mirror 12m is driven with a fixed amplitude and a variable frequency f1. In contrast, the oscillation of the slave mirror 12s is driven with a variable amplitude, a variable frequency f2, and a fixed frequency relation to the frequency f1 of the master mirror. Thus, the master mirror is driven in mirror amplitude control mode and the slave mirror is driven in PLL control mode.

Once a fixed frequency ratio between both mirrors is introduced, the frequency of the slave mirror will vary as the frequency of the master mirror varies, but at a slower rate. The new frequency for the slave mirror will be defined by the PFD 41 and the loop filter 43, which provides the activation value $S_{AV}$ as a configuration setting to the slave driver. The slave driver runs the slave mirror according to the activation value $S_{AV}$ until the next update to the activation value $S_{AV}$. Thus, upon receiving the activation value $S_{AV}$, the slave driver adjusts the frequency f2, if necessary, to comply with the new configuration setting and the actuation of the slave mirror follows the frequency established by the activation value $S_{AV}$.

In approach illustrated in FIG. 5, the master mirror 12m operates at a mirror frequency f1, which is different from the mirror frequency f2 of the slave mirror 12s. This configuration of different mirror frequencies may be employed in a 2D Lissajous scanning system, which requires a defined fractional relationship between the frequencies of two scanning mirrors to be maintained. Thus, mirror frequency f2 may be a defined fraction of mirror frequency f1, or vice versa, such that a "discrepancy" between mirror frequencies exists. In one example, mirror frequency f1 may be 2000 Hz and mirror frequency f2 may be 1950 Hz.

After both MEMS mirrors are driven to their upper resonance curves (i.e., the master mirror in PLL and amplitude control modes, and the slave mirror in PLL control mode only), the PFD 41 is fed by both position signals that are divided by a factor or M (i.e., 1/M) and a factor of N (i.e., 1/N), respectively. In particular, a divider 51 receives the slave position signal, divides the frequency of the slave position signal by M, and outputs a frequency-divided slave position signal $L_M$ to the PFD 41. Similarly, a divider 52 receives the master position signal, divides the frequency of the master position signal by N, and outputs a frequency-divided master position signal $L_N$ to the PFD 41. M and N are different integer constants used to compensate for the defined fractional relationship between the frequencies of the two position signals. Therefore, the purpose of the division of by different factors M and N is to negate the "discrepancy" between frequencies of the positions signals such that the intentional fractional relationship is negated for the PFD 41. Meanwhile, a discrepancy may still exist due to the mirrors being out of sync from the intended fractional relationship, which is then detected by the PFD 41.

The PFD 41 determines whether the frequency of the frequency-divided slave position signal $L_M$ is faster, slower, or equal to the frequency of the frequency-divided slave position signal $L_N$. In particular, the PFD 41 includes logic that evaluates the phase and the frequency of both frequency-divided position signals, and determines which of the two frequency-compensated position signals has a zero-crossing earlier or more often (e.g. which has a higher frequency) and adjusts a phase error signal PE based on the determination, as similarly described in reference to FIG. 4. When the two frequency-compensated position signals differ in phase and frequency, it indicates that the slave mirror is out of sync of the predefined fractional relationship and needs correction.

Based on the output of the loop filter 43 (i.e., the actuation value $S_{AV}$), the frequency f2 of the slave mirror 12s is maintained to be proportional to the frequency f1 of the master mirror 12m according to the predefined fractional relationship thereof.

Figure 6:
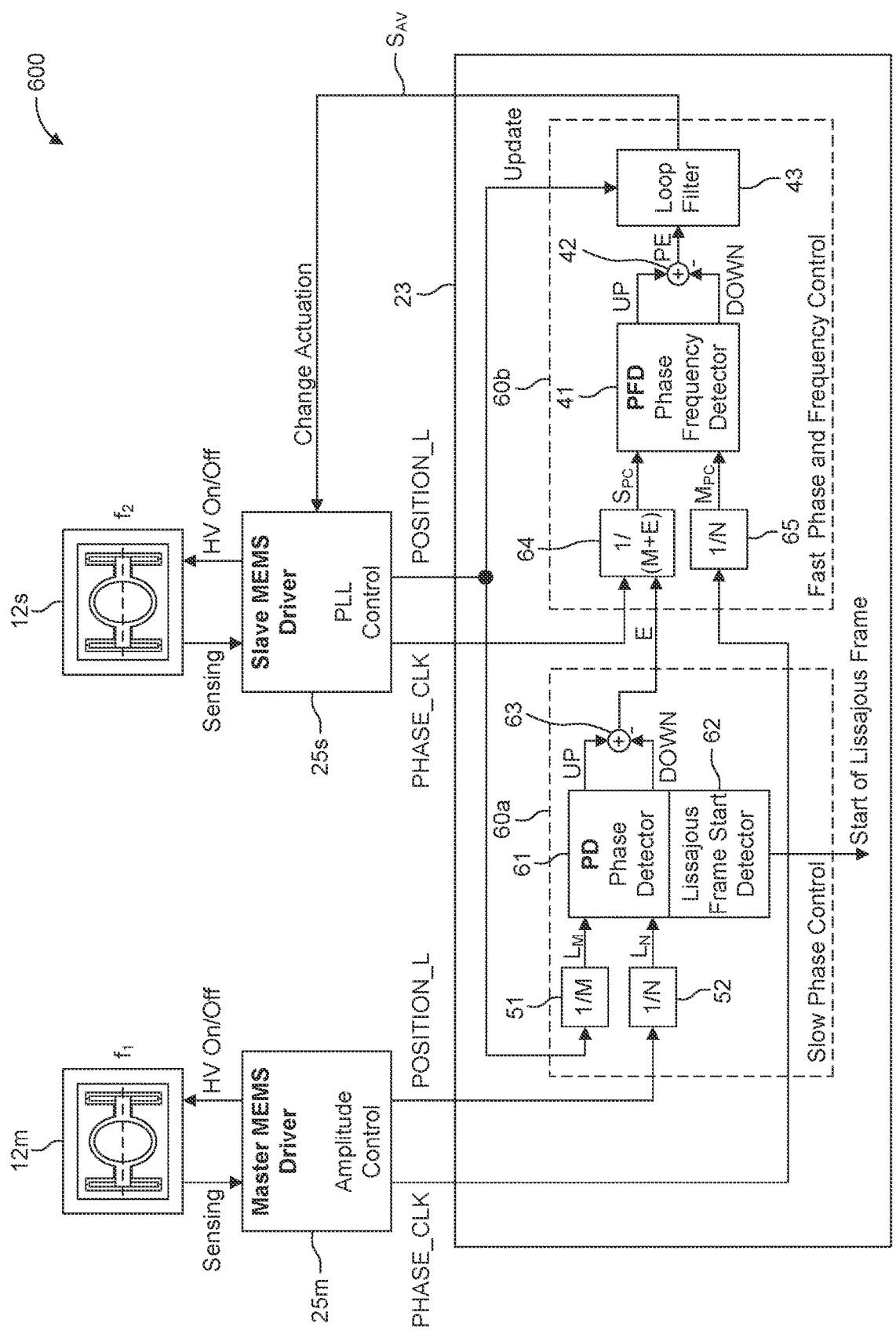
FIG. 6 illustrates a schematic block diagram of another scanning system according to one or more embodiments.

FIG. 6 illustrates a schematic block diagram of a scanning system 600 according to one or more embodiments. The scanning system 600 employs fast-reacting proportional frequency synchronization between a master mirror 12m and a slave mirror 12s. In this example, the oscillation of the master mirror 12m has a fixed amplitude and a variable frequency, whereas the oscillation of the slave mirror 12s has a variable amplitude, a variable frequency, and a fixed frequency relation to the frequency f1 of the master mirror.

A fixed amplitude and a variable frequency means that a MEMS driver is driven in the mirror amplitude control mode, while a variable amplitude and a variable frequency means that a MEMS driver is driven in the PLL control mode (i.e., the actuation follows the oscillating frequency of the mirror) according to the synchronization with the master mirror.

The approach illustrated in FIG. 6 exploits the high-frequency phase clock signal (Phase_CLK) generated by both drivers 25m and 25s. As noted above, the phase clock signal divides the mirror movement of its respective mirror in a well-defined number of phase-slices. For example, thousands of phase slices (e.g., 16,000 phase slices), each indicating a discrete position of the mirror, may be indicated by pulses in the phase clock signal. A fixed number of discrete positions are equally spaced from each other between two zero-crossing events. Thus, the frequency of the phase clock signal changes as the time interval between consecutive zero-crossing events changes.

After both MEMS mirrors were driven to their upper resonance curves (i.e., the master mirror in PLL and amplitude control modes, and the slave mirror in PLL control mode only), the PFD 41 is fed by both phase clock signals that are divided by a factor of (M+E) (i.e., 1/(M+E)) and a factor of N (i.e., 1//N) by dividers 64 and 65, respectively. The output of the PFD 41 is used to generate a phase error signal PE that is fed into the loop filter 43. The output of the loop filter 43 (i.e., actuation value $S_{AV}$) defines the actuation setting of the slave mirror 12s.

This configuration of different mirror frequencies f1 and f2 may be employed in a 2D Lissajous scanning system, which requires a defined fractional relationship between the frequencies of two scanning mirrors to be maintained.

The system controller 23 includes a slow phase control unit 60a and a fast phase control unit 60b. The slow phase control unit 60a includes the divider 51 and the divider 52. The divider 51 receives the slave position signal, divides the frequency of the slave position signal by M, and outputs a frequency-divided slave position signal $L_M$ to a phase detector (PD) 61. Similarly, a divider 52 receives the master position signal, divides the frequency of the master position signal by N, and outputs a frequency-divided master position signal $L_N$ to the phase detector 61. M and N are different integer constants used to compensate for the defined fractional relationship between the frequencies of the two position signals so that the phase detector 61 can compare "equivalent" signals.

The slow phase control unit 60a further includes the phase detector 61, a Lissajous frame start detector 62, and a subperiod error signal generator 63. The phase detector 61 receives the two frequency-divided position signals $L_M$ and $L_N$, and detects a phase difference between them. The phase difference, indicates whether the frequency of the slave mirror 12s is faster, slower, or equal to the frequency of the master mirror 12m. In particular, the phase detector 61 includes logic that evaluates the phase of both position signals and generates a voltage signal which represents the difference in phase between two signal inputs, and generates up and down control signals based on the phase difference.

The subperiod error signal generator 63 receives the up and down control signals and adjusts a subperiod error signal E based on the control signals. Thus, the subperiod error signal E is representative of the measured phase difference.

For example, the phase detector 61 may generate either an "up" control pulse or a "down" control pulse and provides the respective control pulse to the subperiod error signal generator 63. In response to receiving an up control signal, subperiod error signal generator 63 increments the subperiod error signal E. Conversely, in response to receiving a down control signal, the phase error signal generator decrements the error signal E. Thus, the subperiod error signal E indicates the phase relationship between the two mirrors 12*m* and 12*s*.

For instance, the subperiod error signal E may be a positive value if the slave mirror is operating slower than the master mirror, thus indicating that the phase of the slave mirror should be increased. Alternatively, the subperiod error signal E may be a negative value if the slave mirror is operating faster than the master mirror, thus indicating that the phase of the slave mirror should be decreased. Alternatively, the subperiod error signal E may be a zero if the phase of the slave mirror is matched with the phase of the master mirror, thus indicating that the current phase of the slave mirror should be maintained unchanged.

In addition, the Lissajous frame start detector 62 also receives the phase difference from the phase detector 61 and determines a start of a next Lissajous frame based thereon. In particular, the Lissajous frame start detector 62 detects a start of a Lissajous frame when both mirrors cross their zero position at the same time (e.g., when the phase difference between position signal $L_M$ and $L_N$ determined by the phase detector 61 is zero or at some other predetermined value). The next frame starts at this simultaneous zero-crossing event.

Thus, the Lissajous frame start detector 62 is configured to generate and output a frame start detection signal upon detecting the simultaneous zero-crossing event or zero-phase difference event based on the frequency-divided position signals $L_M$ and $L_N$. The next frame signal may be output to a signal processor that processes image data received by LIDAR sensors that utilize the scanning mirrors 12*m* and 12*s*. In particular, the signal processor may use the next frame signal to identify a start of a new frame of image data, and thus an end of a current frame.

The fast phase control unit 60*b* receives the subperiod error signal E from the slow phase control unit 60*a*, the phase clock signals generated by both drivers 25*m* and 25*s*, and the slave position signal from the slave mirror 12*s*. The fast phase control unit 60*b* includes two dividers 64 and 54, the PFD 41, the phase error signal generator 42, and the loop filter 43. Additionally, the loop filter 43 receives the position signal from the slave mirror 12*s* which triggers the loop filter 43 to update the activation value $S_{AV}$. In particular, the loop filter 43 may generate an update to the activation value $S_{AV}$ in response to receiving a pulse in the slave position signal indicating a zero-crossing event, and then output the updated activation value $S_{AV}$ to the slave MEMS driver 25*s*.

Having received the subperiod error signal E, the divider 64 further receives the slave phase clock signal, divides the frequency of the slave phase clock signal by (M+E), and outputs a frequency-divided slave phase clock signal $S_{PC}$ to the PFD 41. Similarly, a divider 65 receives the master phase clock signal, divides the frequency of the master position signal by N, and outputs a frequency-divided master phase clock signal $M_{PC}$ to the PFD 41. M and N are different integer constants used to compensate for the defined fractional relationship between the frequencies of the two position signals. Furthermore, the sub-period error signal E is used to update the M divisor of the fast phase-frequency control loop.

The purpose of updating the M divisor with the sub-period error signal E is explained. As the mirrors will be synchronized (frequency-wise) on a faster rate, it is important to ensure that once in a while both mirrors will be phase-and-frequency synchronized since 2D Lissajous scanning relies on this synchronization. This will allow a slow phase shift to scan a full frame.

Therefore, the purpose of the division of by different factors (M+E) and N is to negate the "discrepancy" between frequencies of the positions signals such that the intentional fractional relationship is negated for the PFD 41. Meanwhile, a discrepancy may still exist due to the mirrors being out of sync from the intended fractional relationship, which is then detected by the PFD 41. As a result the slow phase control takes care of the alignment of the frame start for both, the M- and the N-divided mirrors.

Figure 7:
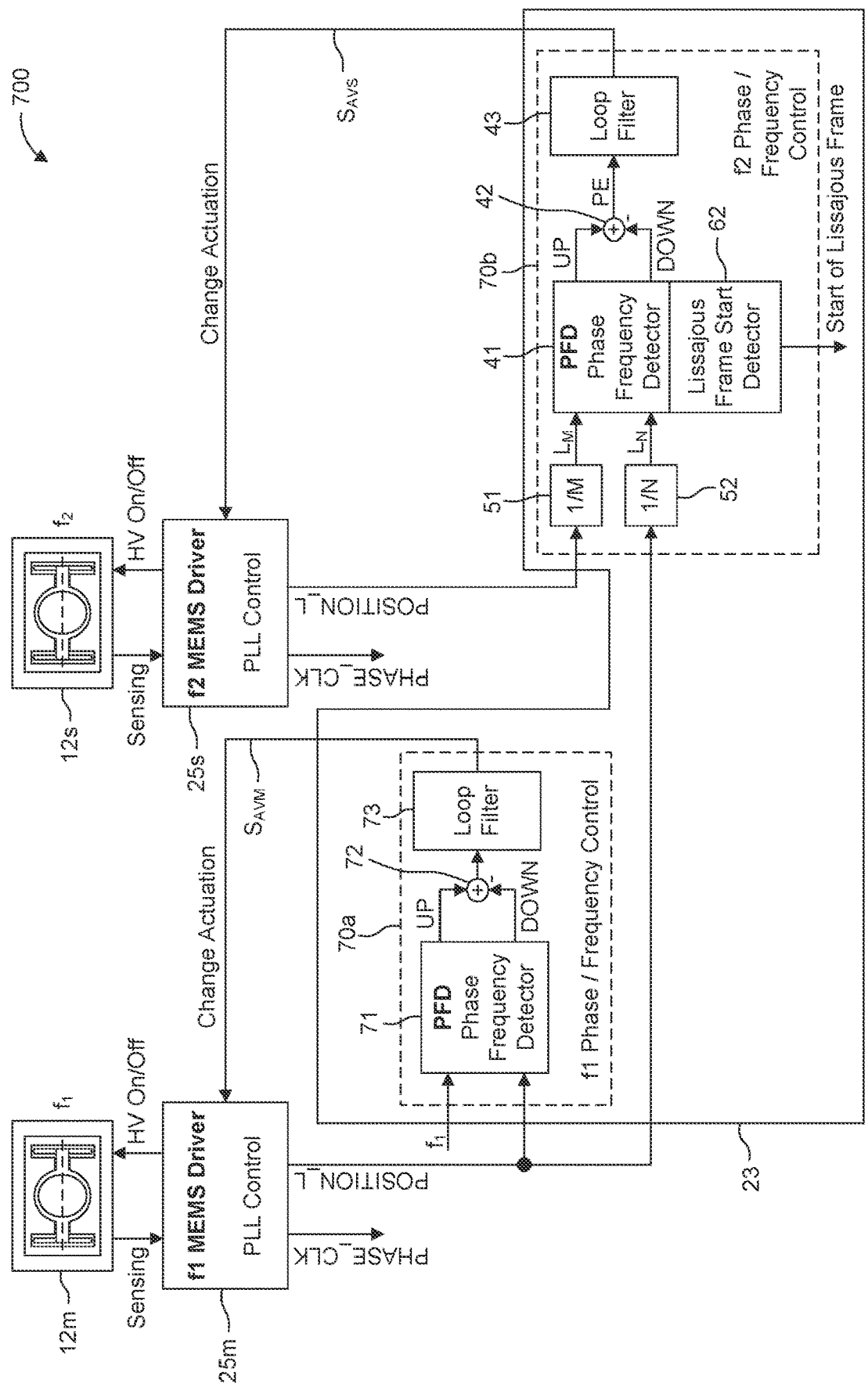
FIG. 7 illustrates a schematic block diagram of another scanning system according to one or more embodiments.

FIG. 7 illustrates a schematic block diagram of a scanning system 700 according to one or more embodiments. The scanning system 700 employs coarse proportional frequency synchronization between a master mirror 12*m* and a slave mirror 12*s*. In this example, the oscillation of the master mirror 12*m* has a variable amplitude and a fixed frequency, whereas the oscillation of the slave mirror 12*s* has a variable amplitude, a fixed frequency, and a fixed frequency relation to the frequency f1 of the master mirror. Both mirrors are operated in the PLL control mode. The fixed frequency is actually due to the external control loop that changes the actuation in such a way that the frequency will remain constant.

The scanning system 700 includes a system controller 23 that includes an f1 phase/frequency control unit 70*a*, configured to maintain the fixed frequency f1 of the master mirror 12*m*, and an f2 phase/frequency control unit 70*b* configured to maintain the fixed frequency f2 of the slave mirror 12*s*. Like embodiments described above, frequencies f1 and f2 are different and have a predefined fractional relationship.

The f1 phase/frequency control unit 70*a* includes a PFD 71, a phase error signal generator 72, and a loop filter 73. The PFD 71, the phase error signal generator 72, and the loop filter 73 operate in a similar manner as the PFD 41, a phase error signal generator 42, and a loop filter 43, with the following exceptions. The PFD 71 receives a reference frequency signal f1 as its first input and the master position signal as its second input. The reference frequency signal f1 is a signal having its frequency set at f1.

Based on its two inputs, the PFD 71 performs phase and frequency comparisons and determines whether the frequency of the master mirror 12*m* is faster, slower, or equal to the frequency of the reference frequency signal f1. In particular, the PFD 71 includes logic that evaluates the phase and the frequency of both input signals, and determines a difference between the input signals (e.g. which has a higher frequency) and adjusts a phase error signal generated by the phase error signal generator 72 based on the determination. Alternatively, the PFD 71 may be replaced with a frequency detector such that only a frequency difference between input signals is used for generating the phase error signal.

The loop filter 73 receives the phase error signal from the phase error signal generator 72, and sets a master actuation value $S_{AVM}$ (e.g., a drive voltage off timing or a voltage level of the drive voltage) based on the phase error signal. The activation value $S_{AVM}$ serves as a configuration setting to the master MEMS driver 25m. The loop filter 73 then provides the actuation value $S_{AVM}$ to the master MEMS driver 25m, which generates an actuation signal based on the actuation value $S_{AVM}$ received from the loop filter 73.

The actuation signal is provided to the master MEMS mirror 12m to control the phase/frequency of the mirror oscillation such that the phase and frequency are matched with that of the reference frequency signal f1. Thus, the output of the loop filter 73 defines the actuation of the master mirror 12m. In turn, the master MEMS mirror 12m either speeds up or slows down in order to achieve synchronization with reference frequency signal f1. This configuration allows the master MEMS mirror 12m to be more robust to temperature change, aging, and other effects that may alter the oscillation frequency.

The f2 phase/frequency control unit 70b includes dividers 51 and 52, PFD 41, Lissajous frame start detector 62, phase error signal generator 42, and loop filter 43, and is configured set an activation value $S_{AVS}$ such that the slave mirror 12s follows the frequency and the phase of the master mirror 12m according to the predefined fractional relationship. To achieve this, the f2 phase/frequency control unit 70b receives the slave and the master position signals, which are input to the dividers 51 and 52, respectively.

The PFD 41 is fed by both position signals that are divided by a factor or M (i.e., 1/M) and a factor of N (i.e., 1/N), respectively. In particular, a divider 51 receives the slave position signal, divides the frequency of the slave position signal by M, and outputs a frequency-divided slave position signal $L_M$ to the PFD 41. Similarly, a divider 52 receives the master position signal, divides the frequency of the master position signal by N, and outputs a frequency-divided master position signal $L_N$ to the PFD 41.

The PFD 41 determines whether the frequency of the frequency-divided slave position signal $L_M$ is faster, slower, or equal to the frequency of the frequency-divided slave position signal $L_N$. In particular, the PFD 41 includes logic that evaluates the phase and the frequency of both frequency-divided position signals, and determines which of the two frequency-compensated position signals has a zero-crossing earlier or more often (e.g. which has a higher frequency) and adjusts a phase error signal PE based on the determination, as similarly described in reference to FIG. 5. When the two frequency-compensated position signals differ in phase and frequency, it indicates that the slave mirror is out of sync of the predefined fractional relationship and needs correction.

Based on the output of the loop filter 43 (i.e., the actuation value $S_{AVS}$), the frequency f2 of the slave mirror 12s is maintained to be proportional to the frequency f1 of the master mirror 12m according to the predefined fractional relationship thereof.

The synchronization may be configured according to the following algorithm:
Define a required scan amplitude of master mirror MEMS1 (e.g., 10°);
  Define frame rate (FR) (e.g., 25 Hz);
  Set the oscillation amplitude (e.g., 15 degrees);
  Measure the frequency corresponding to this amplitude: f0 (e.g., f0=2123.343 Hz);
  Define a target frequency for MEMS1 f1=FR ceil(f0/FR) (e.g., f1=2125);

Define target frequency for slave mirror MEMS2 f2 using the following rules:
  f2/FR—integer;
  Greatest Common Divisor (GCD) (f1/FR, f2/FR)=1;
  f1/FR+f2/FR—delivers the maximum amongst all possible choices of f2; and
  Control f1 and f2.

Figure 8:
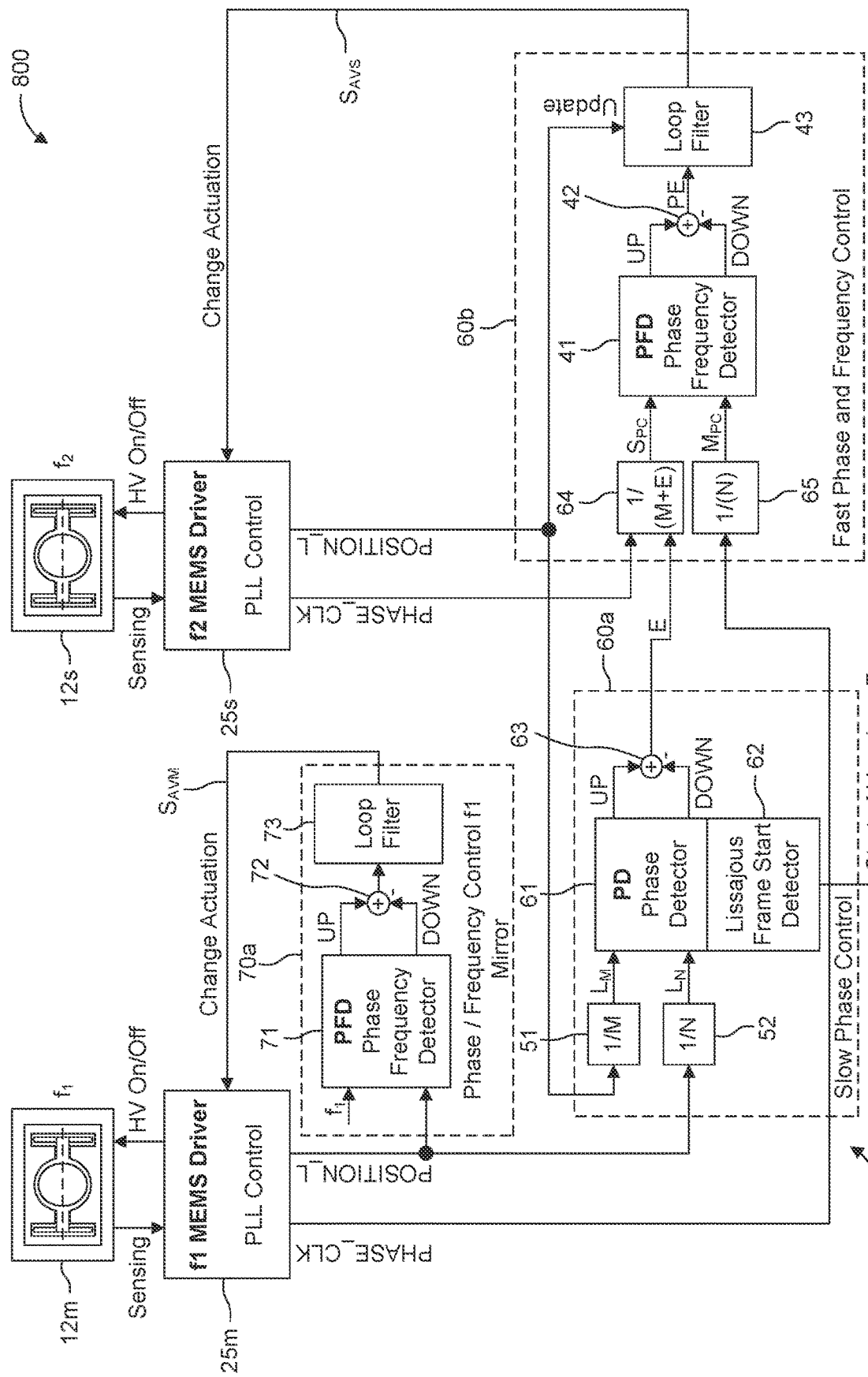
FIG. 8 illustrates a schematic block diagram of another scanning system according to one or more embodiments.

FIG. 8 illustrates a schematic block diagram of a scanning system 800 according to one or more embodiments. The scanning system 800 employs a fast-reacting proportional frequency synchronization between a master mirror 12m and a slave mirror 12s. In this example, the oscillation of the master mirror 12m has a variable amplitude and a fixed frequency, whereas the oscillation of the slave mirror 12s has a variable amplitude, a fixed frequency, and a fixed frequency relation to the frequency f1 of the master mirror. Both mirrors are operated in the PLL control mode. The fixed frequency is actually due to the external control loop that changes the actuation in such a way that the frequency will remain constant.

The scanning system 800 includes a system controller 23 that includes the f1 phase/frequency control unit 70a, configured to maintain the fixed frequency f1 of the master mirror 12m, the slow phase control unit 60a, and the fast phase control unit 60b. The slow phase control unit 60a and the fast phase control unit 60b operate as similarly described in FIG. 6, along with the frequency of the master mirror 12m being fixed to f1 by the f1 phase/frequency control unit 70a, as described in FIG. 7.

Thus, based on the output of the loop filter 43 (i.e., the actuation value $S_{AVS}$), the frequency f2 of the slave mirror 12s is maintained to be proportional to the frequency f1 of the master mirror 12m according to the predefined fractional relationship thereof.

Figure 9:
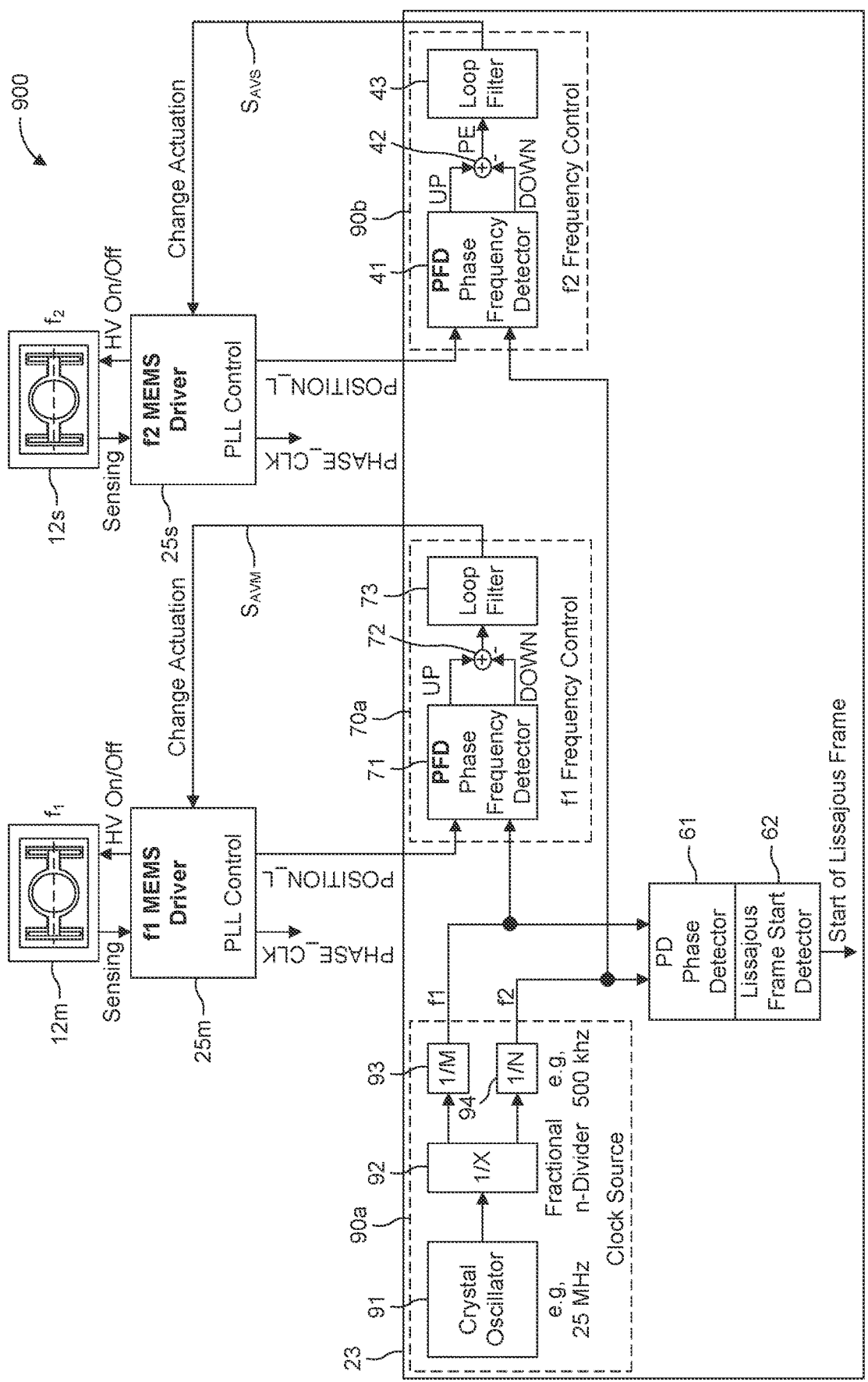
FIG. 9 illustrates a schematic block diagram of another scanning system according to one or more embodiments.

FIG. 9 illustrates a schematic block diagram of a scanning system 900 according to one or more embodiments. The scanning system 900 employs a coarse proportional frequency synchronization between a master mirror 12m and a slave mirror 12s. In this example, the oscillation of the master mirror 12m has a variable amplitude and a fixed frequency, whereas the oscillation of the slave mirror 12s has a variable amplitude, a fixed frequency, and a fixed frequency relation to the frequency f1 of the master mirror. Both mirrors are operated in the PLL control mode. The fixed frequency is actually due to the external control loop that changes the actuation in such a way that the frequency will remain constant.

The scanning system 900 includes a system controller 23 that includes an f1 frequency control unit 70a, a clock source 90a, and an f2 frequency control unit 90b. The scanning system 900 is similar to the scanning system 700 in FIG. 7, except that both clocks f1 and f2 are generated by any suitable clock source such as crystal oscillator 91 or an FPGA (not illustrated). In this example, the clock signals f1 and f2 are set at 2200 Hz and 2300 Hz, respectively, but are not limited thereto.

In particular, the clock source 90a uses a crystal oscillator 91, a fractional n-divider 92, a divider 93, and a divider 94 to generate two clock signals f1 and f2 that have a defined fractional relationship at which mirrors 12m and 12s operate. Thus, the frequency of the master mirror 12m is fixed at frequency f1 via the f1 frequency control unit 70a and the frequency of the slave mirror 12s is fixed at frequency f2 via the f2 frequency control unit. In addition, the f2 frequency control unit is configured to maintain the defined fractional relationship between the two mirrors.

The f1 frequency control unit 70a is configured to set the activation value $S_{AVM}$ in a similar manner described above with respect to the scanning system 700. Here, the f1 frequency control unit 70a received the clock signal f1 as the reference frequency signal f1.

The f2 frequency control unit 90b is configured to set the activation value $S_{AVS}$ in a similar manner described above with respect the frequency control unit (i.e., the PFD 41, the phase error signal generator 42, and the loop filter 43) of the scanning system 400. Here, the PFD 41 receives the clock signal f2 (i.e., a reference frequency signal) as a first input and the slave position signal as a second input.

Based on its two inputs, the PFD 41 performs phase and frequency comparisons and determines whether the frequency of the slave mirror 12s is faster, slower, or equal to the frequency of the clock signal f2. In particular, the PFD 41 includes logic that evaluates the phase and the frequency of both input signals, and determines a difference between the input signals (e.g. which has a higher frequency) and adjusts a phase error signal generated by the phase error signal generator 42 based on the determination.

The loop filter 43 receives the phase error signal from the phase error signal generator 42, and sets a slave actuation value $S_{AVS}$ (e.g., a drive voltage off timing or a voltage level of the drive voltage) based on the phase error signal. The activation value $S_{AVS}$ serves as a configuration setting to the slave MEMS driver 25s. The loop filter 43 then provides the actuation value $S_{AVS}$ to the slave MEMS driver 25s, which generates an actuation signal based on the actuation value $S_{AVS}$ received from the loop filter 43.

Thus, the clock source 90a establishes the fixed frequencies f1 and f2 according to a predefined fractional relationship, and the f1 frequency control units 70a and 90b are configured to independently maintain the oscillation frequency of their respective mirrors based on the clock signals f1 and f2 and position signals.

The system controller 23 further includes the phase detector 61 and the Lissajous frame start detector 62. The phase detector 61 receives the clock signals f1 and f2, and determines a phase difference therebetween. Two signals with a fixed frequency difference have a phase difference that rotates 360 degrees, which occurs more frequently with a larger frequency difference. Thus, the phase difference will periodically return to zero.

The Lissajous frame start detector 62 receives the phase difference from the phase detector 61 and monitors of a zero-phase difference event. In particular, the Lissajous frame start detector 62 detects a start of a Lissajous frame when the phase difference determined by the phase detector 61 is zero. The next frame starts at this simultaneous zero-phase difference event.

The phase clock signals may also be used, as similarly presented in FIG. 8, to obtain fast-reacting proportional frequency synchronization.

In view of the described embodiments, phase/frequency synchronization of two or more MEMS mirrors is achieved.

A multi-mirror system includes a first mirror configured to oscillate about a first axis; a second mirror configured to oscillate about a second axis, wherein a first one of the first mirror and the second mirror is configured as a master mirror and a second one of the first mirror and the second mirror is configured as a slave mirror; a first driver configured to drive an oscillation of the first mirror, measure a first frequency of the first mirror, and generate a first measurement signal that indicates the first frequency; a second driver configured to drive an oscillation of the second mirror, measure a second frequency of the second mirror, and generate a second measurement signal that indicates the second frequency; and a system controller configured to receive the first measurement signal and the second measurement signal, compare the first measurement signal with the second measurement signal to generate a comparison result indicating which of the first and the second mirrors has a lower frequency, and select one of the first mirror or the second mirror as the master mirror having the lower frequency indicated by the comparison result.

A multi-mirror system includes a first mirror configured to oscillate about a first axis; a second mirror configured to oscillate about a second axis; a first driver configured to drive an oscillation of the first mirror, detect first zero-crossing events of the first mirror, and generate a first phase clock signal based on the detected first zero-crossing events, wherein the first driver determines a time interval between two consecutive first zero-crossing events, divides the time interval into first equidistant slices according to a predetermined number of slices, and generates the first phase clock signal having a first pulse at each of the first equidistant slices; and a second driver configured to drive an oscillation of the second mirror, detect second zero-crossing events of the second mirror, and generate a second phase clock signal based on the detected second zero-crossing events, wherein the second driver determines a time interval between two consecutive second zero-crossing events, divides the time interval into second equidistant slices according to the predetermined number of slices, and generates the second phase clock signal having a second pulse at each of the second equidistant slices. The multi-mirror system may further include a synchronization controller configured to receive the first phase clock signal and the second phase clock signal, and synchronize at least one of a phase or a frequency of the oscillation of the first mirror with a phase or a frequency of the oscillation of the first mirror, respectively, based on the first the first phase clock signal and the second phase clock signal.

A MEMS mirror includes a mirror configured to oscillate about an axis; and a driver configured to drive an oscillation of the mirror, detect zero-crossing events of the mirror, and generate a phase clock signal position signal based on the detected zero-crossing events, wherein the driver determines a time interval between two consecutive zero-crossing events, divides the time interval into equidistant slices according to a predetermined number of slices, and generates the phase clock signal having a pulse at each of the equidistant slices.

Although embodiments described herein relate to a MEMS device with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. An oscillator system, comprising:
   an oscillator structure configured to oscillate about a first axis according to a first oscillation and oscillate about a second axis according to a second oscillation;
   a first driver configured to drive the first oscillation of the oscillator structure, receive a first measurement signal representative of an entire angular trajectory traversed by the oscillator structure throughout its first oscillation, detect first crossing events of the oscillator structure at which a value of the first measurement signal is equal to a first predefined value that corresponds to a predefined displacement angle of the oscillator structure with respect to the first axis, and generate a first position signal that indicates each of the detected first crossing events with a signal transition;
   a second driver configured to drive the second oscillation of the oscillator structure, receive a second measurement signal representative of an entire angular trajectory traversed by the oscillator structure throughout its oscillation, detect second crossing events of the oscillator structure at which a value of the second measurement signal is equal to a second predefined value that corresponds to the predefined displacement angle of the oscillator structure with respect to the second axis, and generate a second position signal that indicates each of the detected second crossing events with a signal transition; and
   a synchronization controller configured to receive the first position signal and the second position signal, and synchronize at least one of a phase or a frequency of the first oscillation of the oscillator structure with at least one of a phase or a frequency of the second oscillation of the oscillator structure, respectively, based on the first position signal and the second position signal.

2. The oscillator system of claim 1, wherein the synchronization controller comprises:
   a phase frequency detector configured to receive the first position signal and the second position signal and generate a control signal based thereon; and
   a loop filter configured to generate an actuation value based on the control signal, and transmit the actuation value to the second driver.

3. The oscillator system of claim 2, wherein the second driver is configured to receive the actuation value and control an actuation of the oscillator structure about the second axis based on the actuation value such that the at least one of the phase or the frequency of the first oscillation of the oscillator structure is synchronized with the at least one of the phase or the frequency of the second oscillation of the oscillator structure, respectively.

4. The oscillator system of claim 3, wherein the frequency of the oscillator structure about the first axis has a predefined fractional relationship with the frequency of the oscillator structure about the second axis, wherein the predefined fractional relationship is not equal to 1.

5. The oscillator system of claim 4, wherein the synchronization controller further comprises:
a first divider configured to divide a frequency of the first position signal by a first integer to generate a frequency divided first position signal; and
a second divider configured to divide a frequency of the second position signal by a second integer to generate a frequency divided second position signal, wherein a ratio of the first integer and the second integer negate the predefined fractional relationship in the first position signal and the second position signal,
wherein the phase frequency detector is configured to receive the frequency divided first position signal as the first position signal and receive the frequency divided second position signal as the second position signal.

6. The oscillator system of claim 1, further comprising:
a phase detector configured to receive the first position signal and the second position signal and measure a phase difference therebetween; and
a Lissajous frame start detector configured to receive the measured phase difference and determine a start of a Lissajous frame based on the measured phase difference.

7. The oscillator system of claim 6, wherein the frequency of the oscillator structure about the first axis has a predefined fractional relationship with the frequency of the oscillator structure about the second axis, wherein the predefined fractional relationship is not equal to 1, and the synchronization controller further comprises:
a first divider configured to divide a frequency of the first position signal by a first integer to generate a frequency divided first position signal; and
a second divider configured to divide a frequency of the second position signal by a second integer to generate a frequency divided second position signal, wherein a ratio of the first integer and the second integer negates a predefined fractional relationship between the first position signal and the second position signal,
wherein the phase detector is configured to receive the frequency divided first position signal as the first position signal and receive the frequency divided second position signal as the second position signal.

8. The oscillator system of claim 1, wherein:
the first driver is configured to trigger a change in the first position signal at each of the first crossing events such that the first position signal indicates the frequency and a phase of the first oscillation of the oscillator structure, and
the second driver is configured to trigger a change in the second position signal at each of the second crossing events such that the second position signal indicates the frequency and a phase of the second oscillation of the oscillator structure.

9. The oscillator system of claim 1, wherein the oscillator structure is a microelectromechanical system (MEMS) mirror.

10. The oscillator system of claim 1, wherein the oscillator structure is a non-linear resonator.

11. The oscillator system of claim 1, wherein the predefined displacement angle is associated with a non-zero velocity of the oscillator structure.

12. A method of synchronizing a first oscillation of an oscillator structure about a first axis with a second oscillation of the oscillator structure about a second axis, the method comprising:
driving the first oscillation of the oscillator structure about a first axis;
driving the second oscillation of the oscillator structure about a second axis;
monitoring a first measurement signal representative of an entire angular trajectory traversed by the oscillator structure throughout its first oscillation;
detecting first crossing events of the oscillator structure at which a value of the first measurement signal is equal to a predefined value that corresponds to a predefined displacement angle of the oscillator structure with respect to the first axis;
generating a first position signal that indicates each of the detected first crossing events with a signal transition;
monitoring a second measurement signal representative of an entire angular trajectory traversed by the oscillator structure throughout its second oscillation;
detecting second crossing events of the oscillator structure at which a value of the second measurement signal is equal to a second predefined value that corresponds to the predefined displacement angle of the oscillator structure with respect to the second axis;
generating a second position signal that indicates each of the detected second crossing events with a signal transition; and
synchronizing at least one of a phase or a frequency of the first oscillation of the oscillator structure with at least one of a phase or a frequency of the second oscillation of the oscillator structure, respectively, based on the first position signal and the second position signal.

* * * * *